US012808510B2

(12) United States Patent
Yoo et al.

(10) Patent No.: US 12,808,510 B2
(45) Date of Patent: Nov. 24, 2026

(54) LIGHT-EMITTING MODULE AND VEHICLE LAMP INCLUDING THE SAME

(71) Applicant: SL Corporation, Daegu (KR)

(72) Inventors: Sang Wook Yoo, Gyeongsan-si (KR); Sung Wook Youn, Gyeongsan-si (KR); Ji Hyoun Hwang, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 19/217,545

(22) Filed: May 23, 2025

(65) Prior Publication Data

US 2026/0022813 A1 Jan. 22, 2026

(30) Foreign Application Priority Data

Jul. 19, 2024 (KR) ........................ 10-2024-0095673

(51) Int. Cl.
*F21S 43/40* (2018.01)
*F21S 41/20* (2018.01)
*F21S 41/30* (2018.01)
*F21S 43/20* (2018.01)

(52) U.S. Cl.
CPC ........... *F21S 43/401* (2024.05); *F21S 41/285* (2018.01); *F21S 41/30* (2018.01); *F21S 43/26241* (2024.05)

(58) Field of Classification Search
CPC ........ F21S 43/401; F21S 41/30; F21S 41/285; F21S 43/26241; F21S 43/31; F21S 41/32; F21V 7/00; F21V 7/0008; F21V 7/0016; G02F 1/133602; G02F 1/133606
See application file for complete search history.

(56) References Cited

U.S. PATENT DOCUMENTS

| | | | | |
|---|---|---|---|---|
| 2002/0136025 | A1* | 9/2002 | Zhang | F21K 9/68 362/555 |
| 2006/0146530 | A1* | 7/2006 | Park | G02F 1/133603 362/240 |
| 2010/0102199 | A1* | 4/2010 | Negley | F21V 23/0457 250/201.1 |
| 2016/0076738 | A1* | 3/2016 | Hsueh | G02F 1/133606 362/97.1 |
| 2016/0284674 | A1* | 9/2016 | Kim | H10W 90/00 |
| 2019/0324324 | A1* | 10/2019 | Tai | G02F 1/133603 |
| 2020/0241197 | A1* | 7/2020 | Shin | G02B 6/0028 |

* cited by examiner

*Primary Examiner* — Bao Q Truong
(74) *Attorney, Agent, or Firm* — United One Law Group LLC; Kongsik Kim; Jhongwoo Peck

(57) ABSTRACT

A light-emitting module and a vehicle lamp including the same are provided. The light-emitting module includes: a substrate formed of a transparent material; at least one light source installed on a rear surface of the substrate to emit light in a first direction; a deflection part disposed at a rear of the substrate to cause the light emitted in the first direction to be deflected in a second direction; a holder disposed at the rear of the substrate to support the substrate; and a transmissive material disposed between the substrate and the holder.

11 Claims, 38 Drawing Sheets

LIGHT-EMITTING MODULE AND VEHICLE LAMP INCLUDING THE SAME

CROSS-REFERENCE TO RELATED APPLICATION

This application claims priority from Korean Patent Application No. 10-2024-0095673 filed on Jul. 19, 2024, which is incorporated herein by reference in its entirety.

BACKGROUND

1. Technical Field

The present disclosure relates to a light-emitting module and a vehicle lamp including the same, and more specifically, to a light-emitting module capable of implementing surface emission and a vehicle lamp including the light-emitting module.

2. Description of the Related Art

In general, vehicles are equipped with various types of lamps, each having an illumination function to facilitate the identification of objects around the vehicles during low-light conditions (e.g., nighttime driving) and a signaling function for informing surrounding drivers or pedestrians about the driving state of the vehicles.

For example, headlamps and fog lamps are primarily intended for the illumination function, whereas turn signal lamps, tail lamps, and brake lamps are mainly intended for the signaling function. The installation standards and specifications of these lamps are regulated by law to ensure they adequately perform their respective functions.

Such vehicle lamps may require surface emission for functional or design purposes, and for this purpose, surface emission is implemented by mixing light emitted from a plurality of light sources.

When surface emission is implemented by mixing light rays emitted from the plurality of light sources, a space with a certain gap distance is required to sufficiently mix the emitted light rays, which imposes a limitation on reducing the overall size of the vehicle lamp.

Moreover, when surface emission is implemented by mixing light emitted from the plurality of light sources, relatively higher brightness occurs near each light source, resulting in non-uniform brightness across the surface emission. Consequently, the overall brightness uniformity is reduced.

Therefore, there is a demand for a solution that enables surface emission using multiple light sources, reduces the overall size of the vehicle lamp while enhancing brightness uniformity, and enables the formation of emission images in various shapes.

SUMMARY

An object of the present disclosure is to provide a light-emitting module capable of enabling miniaturization by shortening the gap distance required for light mixing, and a vehicle lamp including the light-emitting module.

Another object of the present disclosure is to provide a light-emitting module and a vehicle lamp including the same, which are capable of improving overall uniformity of brightness when implementing the surface emission by diffusing the light emitted from each light source, and a vehicle lamp including the light-emitting module.

Yet another object of the present disclosure is to provide a light-emitting module capable of implementing emission images of various shapes, and a vehicle lamp including the light-emitting module.

The objects of the present disclosure are not limited to those mentioned above, and other objects not explicitly stated will be clearly understood by those skilled in the art based on the following description.

According to an aspect of the present disclosure, a light-emitting module may include a substrate formed of a transparent material; at least one light source installed on a rear surface of the substrate to emit light in a first direction; a deflection part disposed at a rear of the substrate to cause the light emitted in the first direction to be deflected in a second direction, which is different from the first direction; a holder disposed at the rear of the substrate to support the substrate; and a transmissive material disposed between the substrate and the holder.

The deflection part may include a reflective surface formed on at least a portion of a rear surface of the transmissive material. The reflective surface may include one or more openings (e.g., apertures or slits) to allow an emission image by the light deflected in the second direction to include a plurality of regions having different brightnesses.

The deflection part may include at least one diffusion element formed on a rear surface of the transmissive material to be recessed toward a front surface of the transmissive material to diffuse at least a portion of the light emitted in the first direction and cause it to be deflected in the second direction by reflection and/or refraction depending on an angle of incidence of the light. The at least one diffusion element may be formed in a substantially conical shape, and in some embodiments, a side surface of the at least one diffusion element may be formed to be concave or convex.

The deflection part may include a reflective layer formed on at least a portion of a surface of the holder that faces the substrate. The reflective layer may include one or more openings to allow an emission image by the light deflected in the second direction to include a plurality of regions having different brightnesses.

The deflection part may include a reflective surface formed on at least a portion of a rear surface of the transmissive material; and a reflective layer formed on at least a portion of a surface of the holder that faces the substrate. The reflective surface and the reflective layer may be formed in different colors.

The light-emitting module may further include at least one light diffusion layer disposed to overlap the at least one light source so as to diffuse light that passes near the at least one light source. The at least one light diffusion layer may transmit a portion of the light deflected in the second direction and may reflect another portion of the light deflected in the second direction.

The light-emitting module may further include a cover disposed in front of the substrate to transmit at least a portion of the light deflected by the deflection part therethrough, and the cover may include at least one optical element formed at a position corresponding to the at least one light source to deflect the light transmitted through the substrate.

The substrate may include a reinforcing member formed on at least some edges of the substrate to increase rigidity against externally applied pressure.

According to another aspect of the present disclosure, a vehicle lamp may include a light-emitting module that includes at least one light source; and a diffusion lens disposed in front of the light-emitting module to diffuse light emitted from the light-emitting module. In particular, a direction in which the light is emitted from the light-emitting module may be different from a direction in which light is emitted from the at least one light source.

The light-emitting module may include a substrate having the at least one light source installed on a rear surface thereof; a holder disposed at a rear of the substrate to support the substrate; a transmissive material disposed between the substrate and the holder; and a cover disposed in front of the substrate and assembled with the holder to form a space for accommodating the substrate and the transmissive material therein.

A reflective surface may be formed on at least a portion of a rear surface of the transmissive material to allow light emitted in a first direction from the at least one light source to be deflected in a second direction, which is different from the first direction. The reflective surface may include one or more openings to allow an emission image by the light emitted from the light-emitting module to include a plurality of regions having different brightnesses.

The transmissive material may include at least one diffusion element formed on a rear surface to be recessed toward a front surface of the transmissive material to deflect at least a portion of the light emitted in a first direction from the at least one light source into a second direction by reflection and/or refraction.

A reflective layer may be formed on at least a portion of a surface of the holder that faces the substrate to allow light emitted in a first direction from the at least one light source to be deflected in a second direction, which is different from the first direction. The reflective layer may include one or more openings to allow an emission image by the light emitted from the light-emitting module to include a plurality of regions having different brightnesses.

The light-emitting module may further include a reflective surface formed on at least a portion of a rear surface of the transmissive material; and a reflective layer formed on at least a portion of a surface of the holder that faces the substrate. The reflective surface and the reflective layer may be formed in different colors.

The substrate may include a reinforcing member formed on at least some edges of the substrate to increase rigidity against externally applied pressure.

The light-emitting module and the vehicle lamp including the same, according to the present disclosure, can achieve one or more of the following effects.

Light emitted in a first direction from at least one light source installed on the rear surface of a substrate may be deflected in a second direction by a deflection part, and at least some of the light deflected by the deflection part may pass through a cover disposed in front of the substrate to proceed forward. As a result, the gap distance required for light mixing can be decreased, facilitating miniaturization, and the overall brightness uniformity can be improved when implementing surface emission.

Additionally, emission images with various shapes can be implemented by removing a portion of at least one of a reflective surface or a reflective layer disposed on the rear side of the substrate to reflect and deflect the light emitted from the light source in the second direction, and thereby generating brightness variations in the reflected light.

Further, brightness uniformity for the surface emission can be enhanced by a light diffusion layer disposed to overlap the light source. Also, since the light that passes through the substrate can be deflected by an optical element formed by the cover, shadows that may be potentially caused by the rear side of the light source when viewed from the front can be reduced.

Moreover, a reinforcing member formed on the substrate can strengthen the rigidity of the edges of the substrate, thereby preventing tearing or breakage of the substrate due to contact with a mold during the formation of a transmissive material on the rear side of the substrate.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Figure 1:
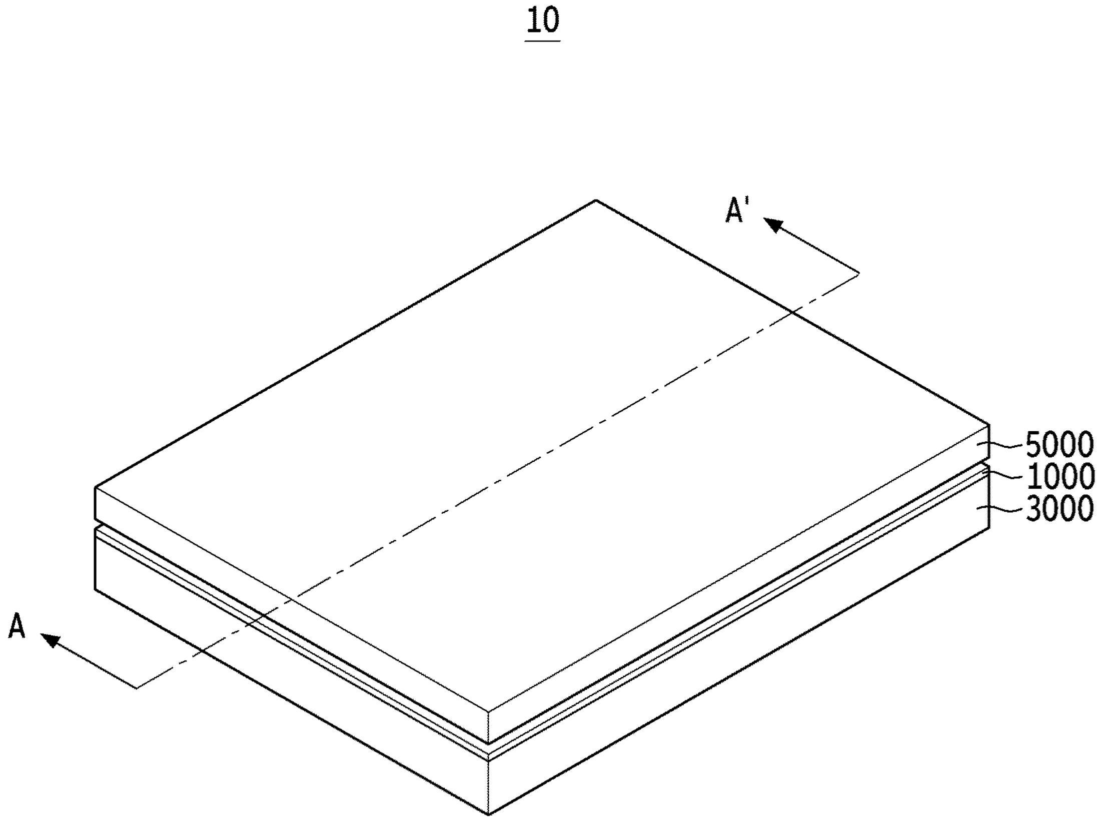
FIG. 1 is a perspective view illustrating a light-emitting module according to a first embodiment of the present disclosure.

Advantages and features of the present disclosure and methods of accomplishing the same may be understood more readily by referring to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

The present disclosure will now be described with reference to the drawings for explaining a light-emitting module and a vehicle lamp including the same, according to embodiments of the present disclosure. The components in each embodiment may be commonly used.

Figure 2:
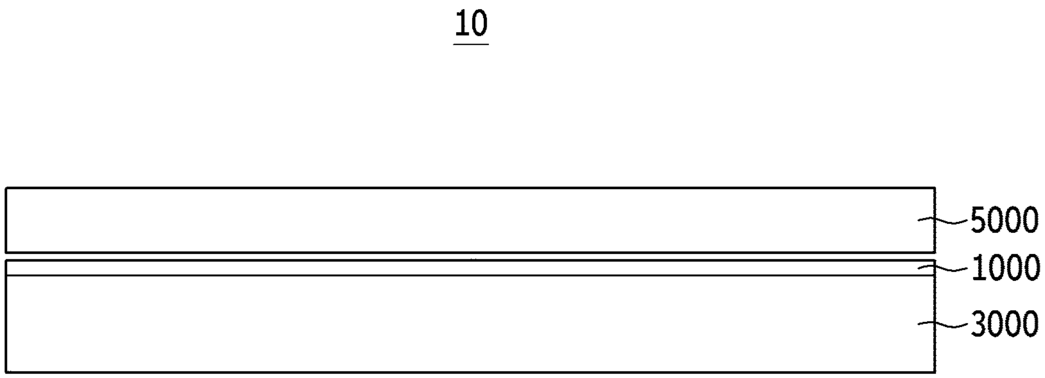
FIG. 2 is a side view illustrating the light-emitting module according to the first embodiment of the present disclosure.
Figure 3:
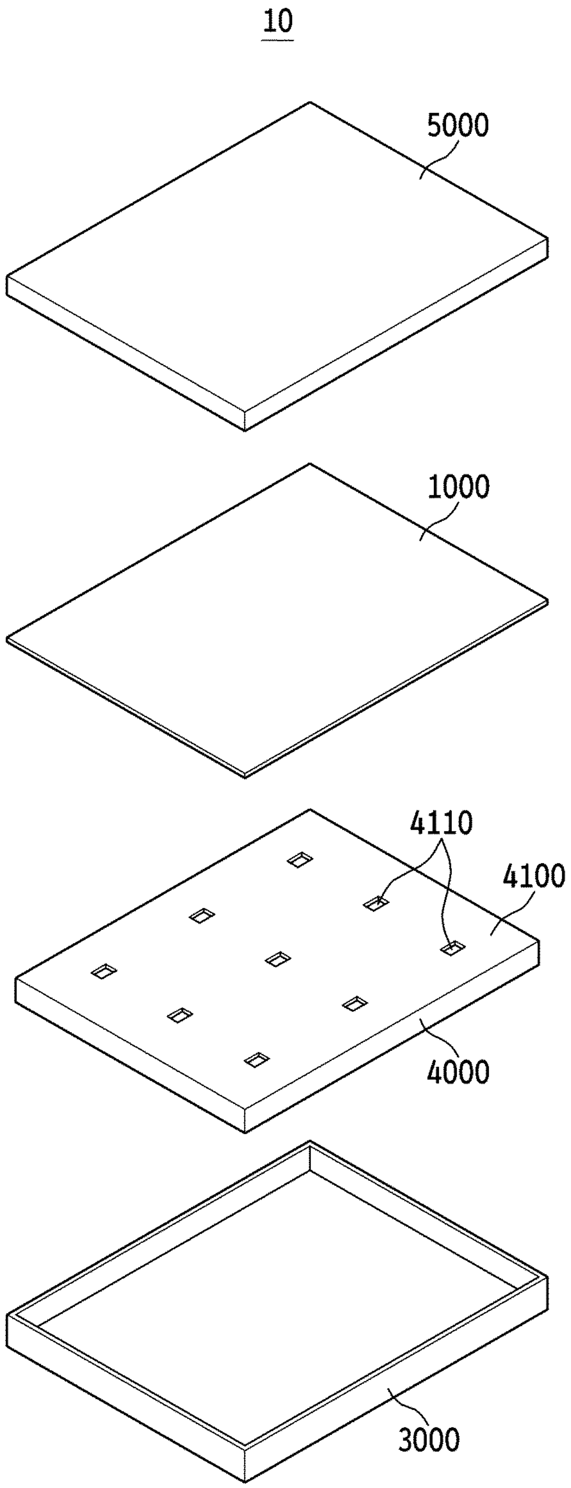
FIGS. 3 and 4 are exploded perspective views illustrating a first light-emitting module according to an embodiment of the present disclosure.
Figure 4:
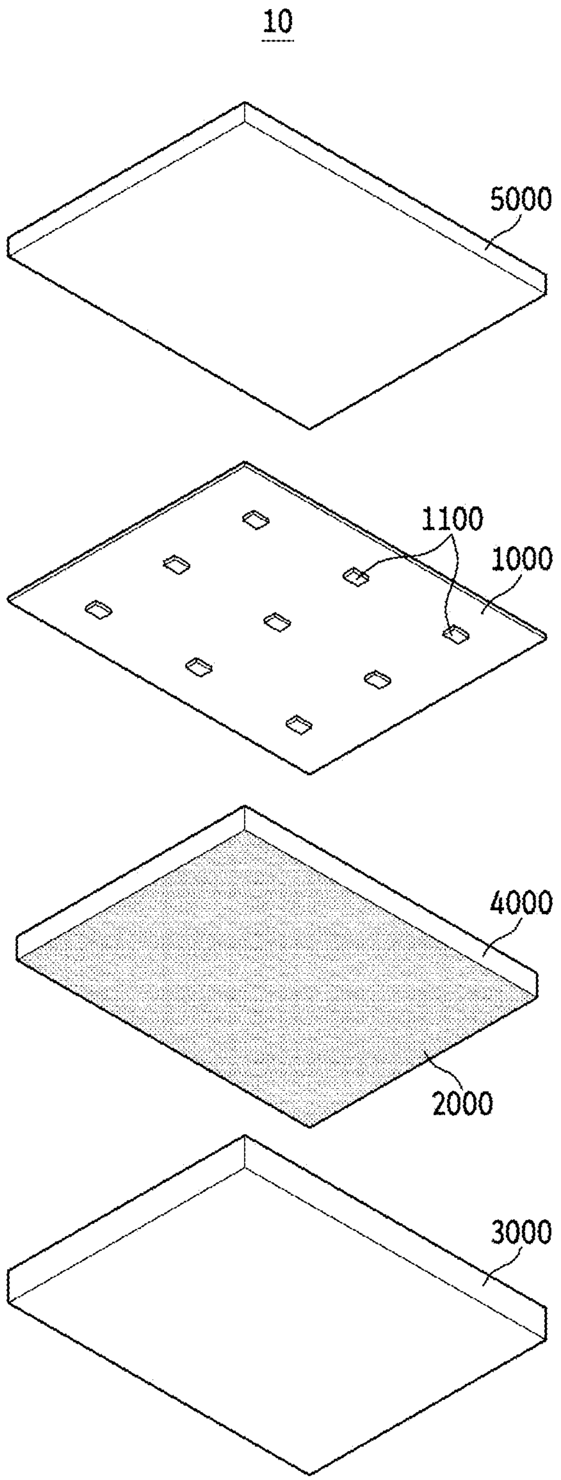
Figure 5:
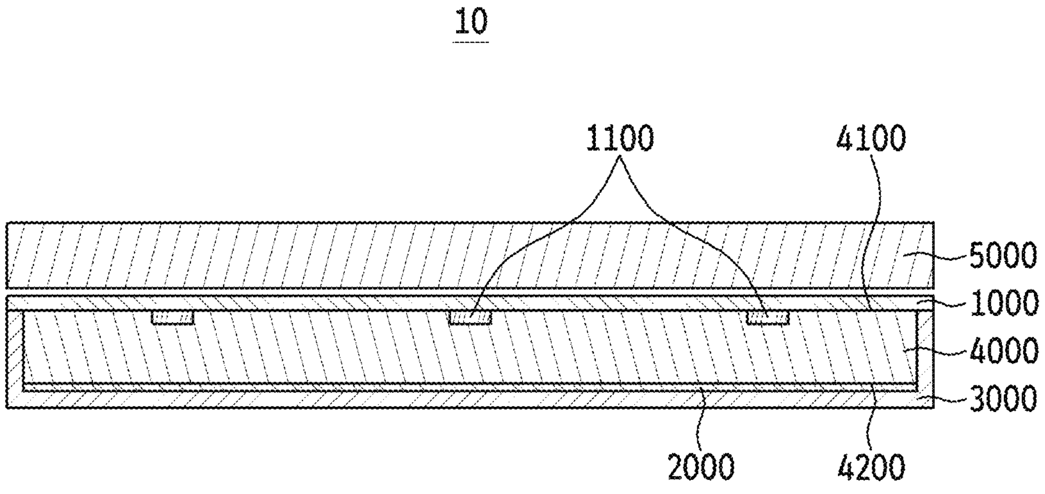
FIG. 5 is a cross-sectional view taken along line A-A' of FIG. 1.

FIG. 1 is a perspective view illustrating a light-emitting module according to a first embodiment of the present disclosure, FIG. 2 is a side view illustrating the light-emitting module according to the first embodiment of the present disclosure, FIGS. 3 and 4 are exploded perspective views illustrating a first light-emitting module according to an embodiment of the present disclosure, and FIG. 5 is a cross-sectional view taken along line A-A' of FIG. 1.

Referring to FIGS. 1 through 5, a light-emitting module 10 according to the first embodiment of the present disclosure may include a substrate 1000 and a deflection part 2000.

In the first embodiment of the present disclosure, an example where the light-emitting module 10 is installed in a vehicle such as an automobile or a train and is used to secure visibility in a dark environment or to inform surrounding vehicles or pedestrians of the driving state of the vehicle will be described. However, the present disclosure is not limited to this application, and the light-emitting module 10 may also be installed in any places or facilities requiring surface emission, as well as transportation means such as vehicles.

One or more light sources 1100 (hereinafter, the first light sources 1100) may be installed on the rear surface of the substrate 1000. In the first embodiment of the present disclosure, a plurality of first light sources 1100 may be arranged at a predetermined distance apart from one another to prevent structural interference.

In the first embodiment of the present disclosure, the first light sources 1100 may be installed on the rear surface of the substrate 1000. In this case, it is assumed that the forward direction is the direction in which light is emitted from the light-emitting module 10, and the front surface of the substrate 1000 may be understood as the visible surface of the light-emitting module 10 when viewed from the front.

The deflection part 2000 may deflect light emitted in a first direction from the first light sources 1100 so that the light may proceed in a second direction by reflection and/or refraction. In the first embodiment of the present disclosure, the deflection part 2000 may be disposed at the rear of the substrate 1000 with a predetermined gap from the substrate 1000 and may allow the light emitted in the first direction from the first light sources 1100 to be reflected and to proceed in the second direction.

In the present disclosure, the first direction may refer to a direction from the substrate 1000 toward the deflection part 2000, and the second direction may collectively refer to one or more directions different from the first direction. In the first embodiment of the present disclosure, the deflection of the light emitted in the first direction into the second direction via the deflection part 2000 may be understood as deflecting the light emitted from each of the first light sources 1100 into one or more directions different from the first direction by reflection and/or refraction.

The substrate 1000 may allow at least a portion of the light deflected in the second direction by the deflection part 2000 to proceed therethrough, thereby enabling the light to be emitted to the outside of the light-emitting module 10, which in turn may allow the implementation of surface emission.

In this case, the light emitted in the first direction from the first light sources 1100 may travel a first distance between the substrate 1000 and the deflection part 2000, while the light deflected in the second direction by the deflection part 2000 may travel a second distance between the deflection part 200 and the substrate 1000. Subsequently, at least a portion of the light deflected in the second direction by the deflection part 2000 may pass through the substrate 1000 and be emitted to the outside of the light-emitting module 10. Accordingly, the light may be allowed to reciprocate between the substrate 1000 and the deflection part 2000, and as a result, the effective optical path length of the light may be increased. Therefore, the space (e.g., gap) required for light mixing can be relatively shortened, which is advantageous for miniaturization.

In other words, when the first light sources 1100 are installed on the front surface of the substrate 1000, the light emitted from the first light sources 1100 proceeds forward, requiring a sufficient gap distance to be present in the front direction of the substrate 1000 to achieve light mixing. In contrast, in the first embodiment of the present disclosure, the light emitted in the first direction from the first light sources 1100, installed on the rear surface of the substrate 1000, may be reflected by the deflection part 2000, disposed at the rear of the substrate 1000, and may be thereby deflected into the second direction. Consequently, since the optical paths of beams of the light overlap between the substrate 1000 and the deflection part 2000, the gap required for sufficient light mixing may be shortened.

Figure 6:
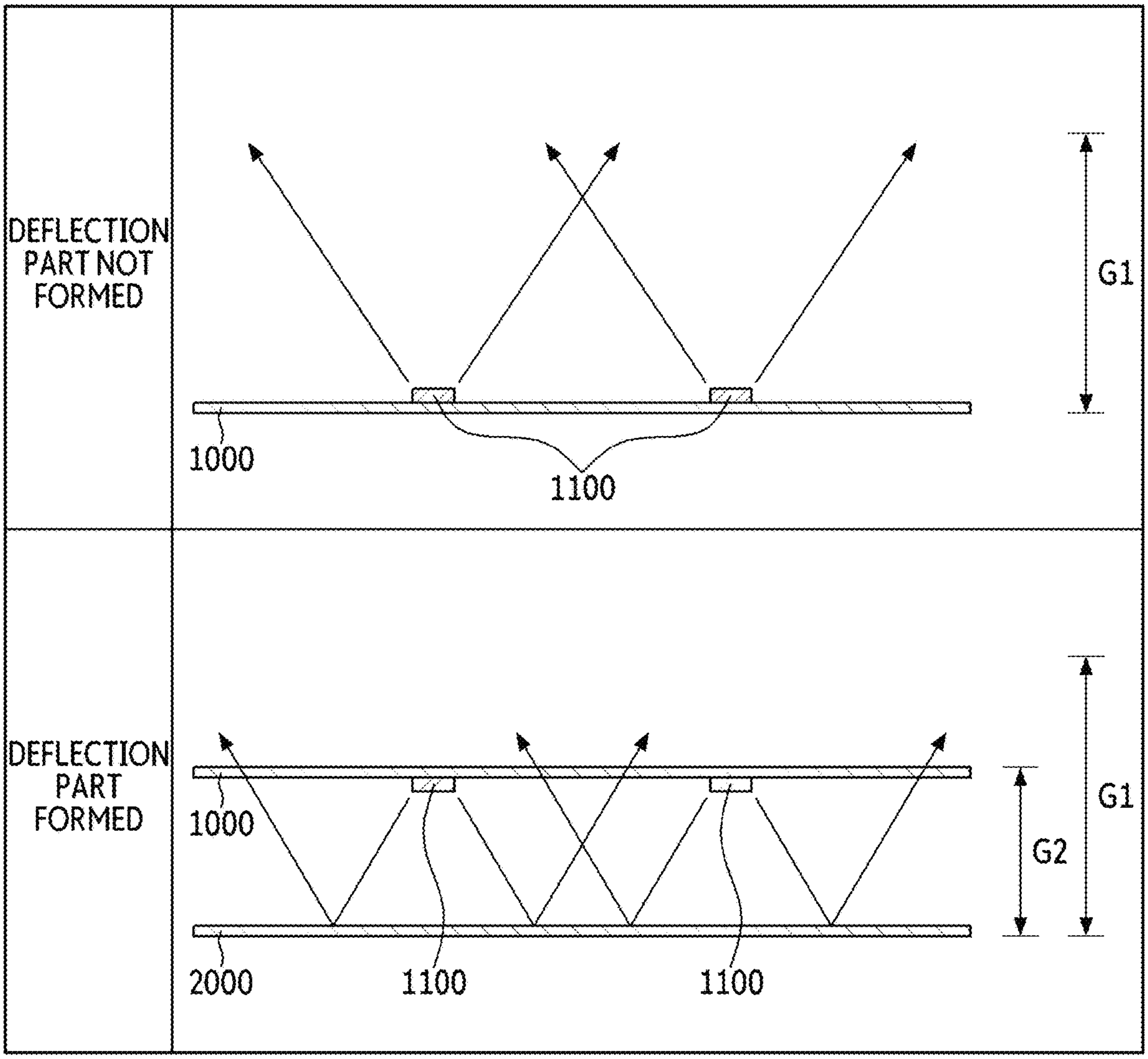
FIG. 6 is a schematic view illustrating the gap required for light mixing according to the first embodiment of the present disclosure.

For example, as illustrated in FIG. 6, when the first light sources 1100 are installed on the front surface of the substrate 1000 to emit light forward, without the deflection part 2000 at the rear of the substrate 1000, a relatively long gap G1 may be required in front of the substrate 1000 for sufficient light mixing. In contrast, in the first embodiment of the present disclosure, the light emitted in the first direction from the first light sources 1100, installed on the rear surface of the substrate 1000, may be deflected in the second direction by the deflection part 2000, disposed at the rear of the substrate 1000. This configuration may allow a gap G2 required for sufficient light mixing to be shorter than the configuration where the first light sources 1100 are installed on the front surface of the substrate 1000.

As described above, when the light emitted from the first light sources 1100 travels the first and second distances prior to being emitted to the outside of the light-emitting module 10, the thickness of the light-emitting module 10 can be reduced relative to the total optical path length of the light emitted from the first light sources 1100, which is advantageous for miniaturization.

In other words, the thickness of the light-emitting module 10 in a front-rear direction may vary depending on the gap required for light mixing of the light emitted from the first light sources 1100. When the first light sources 1100 are installed on the front surface of the substrate 1000, the light-emitting module 10 may require a thickness corresponding to the total optical path length for the light emitted from the first light sources 1100 to sufficiently mix. In contrast, in the first embodiment of the present disclosure, since the light emitted from the first light sources 1100 reciprocates between the substrate 1000 and the deflection part 2000 before being emitted to the outside, the thickness of the light-emitting module 10 may become smaller than the total optical path length of the light emitted from the first light sources 1100, that is, the sum of the first and second distances.

Figure 7:
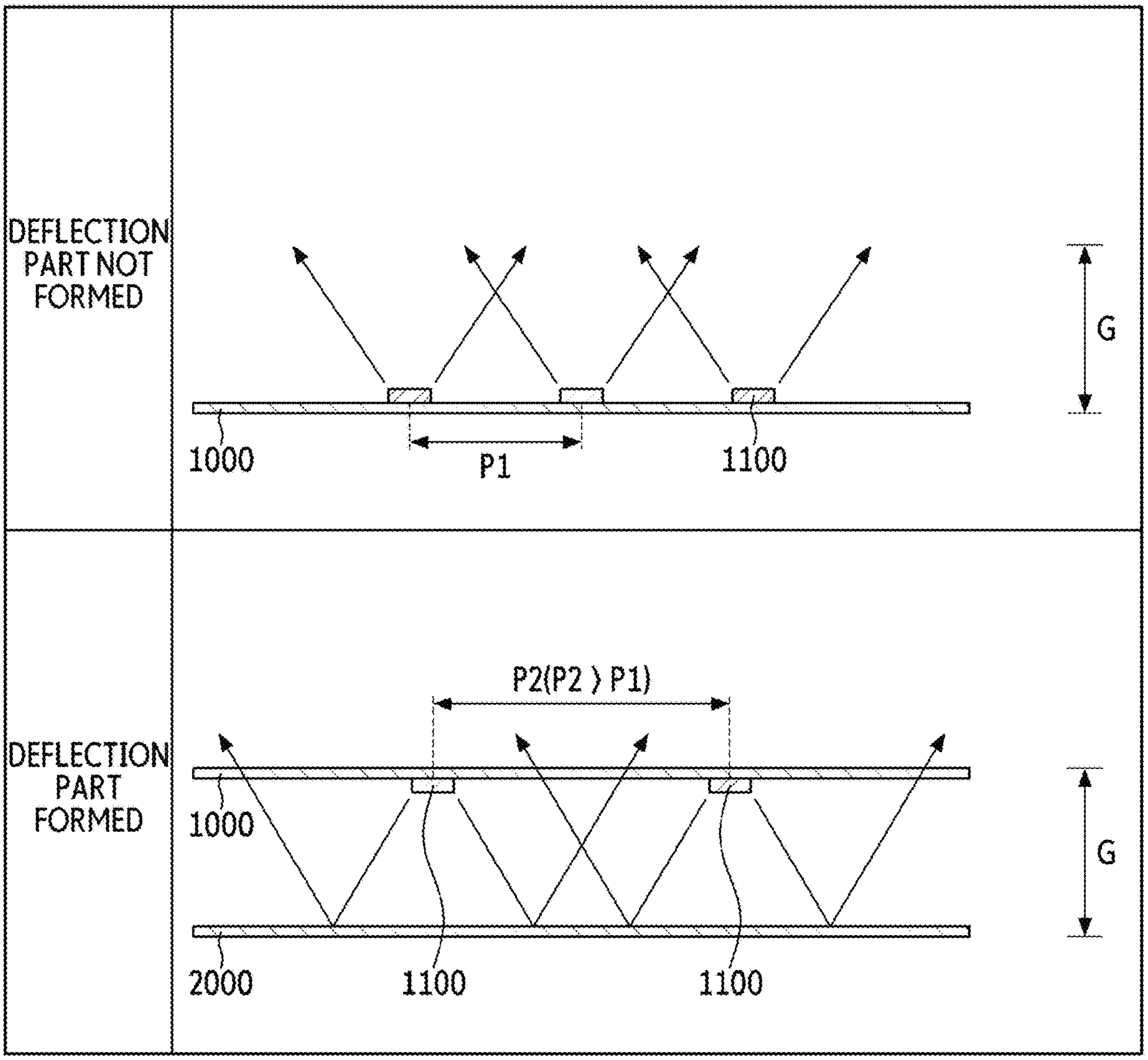
FIG. 7 is a schematic view illustrating the installation spacing of light sources according to the first embodiment of the present disclosure.

Additionally, as illustrated in FIG. 7, when the gaps G provided for light mixing are equal for both configurations with absence and presence of the deflection part 2000, the installation interval (e.g., separation distance) P2 between the first light sources 1100 installed on the rear surface of the substrate 1000 may be made greater than the installation interval P1 between the first light sources 1100 installed on the front surface of the substrate 1000, since the light emitted in the first direction from the first light sources 1100 toward the deflection part 2000, disposed at the rear of the substrate 1000, may be mixed while reciprocating between the substrate 1000 and the deflection part 2000. Consequently, the required number of first light sources 1100 may be reduced, leading to reductions in the number of components and the manufacturing cost.

In order for the light deflected in the second direction by the deflection part 2000 to pass through the substrate 1000 and be emitted externally, the substrate 1000 may be formed of a material that allows light transmission, such as polyester (PET) or colorless polyimide (CPI).

In the first embodiment of the present disclosure, the deflection part 2000 may be configured as a reflective surface disposed on a rear surface 4200 of a transmissive material 4000, which is disposed between the substrate 1000 and a holder 3000 that supports the substrate 1000 at the rear of the substrate 1000. The transmissive material 4000 may be configured to allow the light that travels between the substrate 1000 and the deflection part 2000 to propagate internally through, for example, total internal reflection, thereby preventing light loss due to light leakage.

Additionally, a diffusion material may be included in the transmissive material 4000 to facilitate light diffusion. A detailed description of how to form the transmissive material 4000 will be provided later.

The holder 3000 may be formed with an open surface to accommodate the substrate 1000, the deflection part 2000, and the transmissive material 4000. A cover 5000 may be assembled onto the open surface of the holder 3000 to form an accommodation space for receiving the substrate 1000, the deflection part 2000, and the transmissive material 4000 therein. The light that passes through the substrate 1000 and proceeds forward may further pass through the cover 5000 and be emitted externally. The light that passes through the cover 5000 and proceeds forward may be understood as the light emitted externally from the light-emitting module 10.

In the first embodiment of the present disclosure, the deflection part 2000 may be formed by depositing or coating a material with high reflectivity, such as aluminum or chromium, onto at least a portion of the rear surface 4200 of the transmissive material 4000. Alternatively, the deflection part 2000 may be formed by applying reflective paint with a high reflectivity, such as white paint. However, the present disclosure is not limited to these examples, and the deflection part 2000 may be formed as a separate film and attached to at least a portion of the rear surface 4200 of the transmissive material 4000.

The transmissive material 4000 may include, on its front surface 4100, a plurality of receiving grooves 4110 for accommodating the first light sources 1100. As the first light sources 1100 are disposed within the respective receiving grooves 4110, the substrate 1000 and the transmissive material 4000 may be arranged in close contact with each other.

Figure 8:
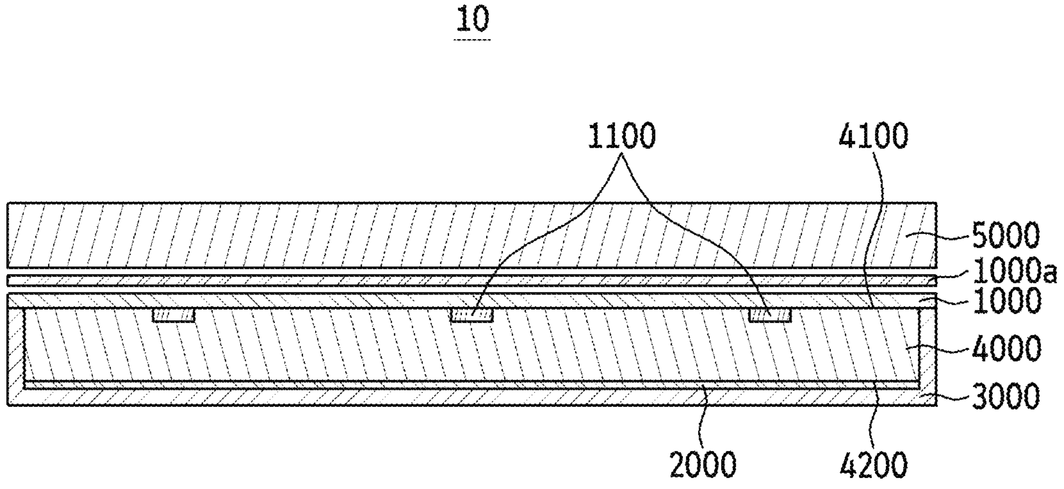
FIG. 8 is a cross-sectional view illustrating a diffusion sheet according to the first embodiment of the present disclosure.

Meanwhile, to diffuse the light that is reflected by the deflection part 2000 and passes through the substrate 1000, a diffusion sheet 1000*a* may be disposed in front of the substrate 1000, as illustrated in FIG. 8. The diffusion sheet 1000*a* may enhance the overall uniformity of brightness when implementing surface emission with the light-emitting module 10.

In the first embodiment of the present disclosure, a diffusion material may be added to the transmissive material 4000, but the present disclosure is not limited thereto. Alternatively or additionally, a diffusion material may be added to other light-transmitting components, such as the substrate 1000, the diffusion sheet 1000*a*, and the cover 5000.

FIG. 8 illustrates an example where the diffusion sheet 1000*a* is disposed in front of the substrate 1000, but the present disclosure is not limited thereto. The diffusion sheet 1000*a* may be disposed at the front and/or rear of the substrate 1000.

Additionally, the first light sources 1100 may emit light having a specific color. In some embodiments, the first light sources 1100 may emit excitation light that is suitable for exciting a phosphor. When the light emitted from the first light sources 1100 functions as the excitation light, a phosphor sheet 1000*b* which includes a phosphor material may be disposed in front of the substrate 1000, as illustrated in FIG. 9, or in front of the deflection part 2000, as illustrated in FIG. 10.

Figure 9:
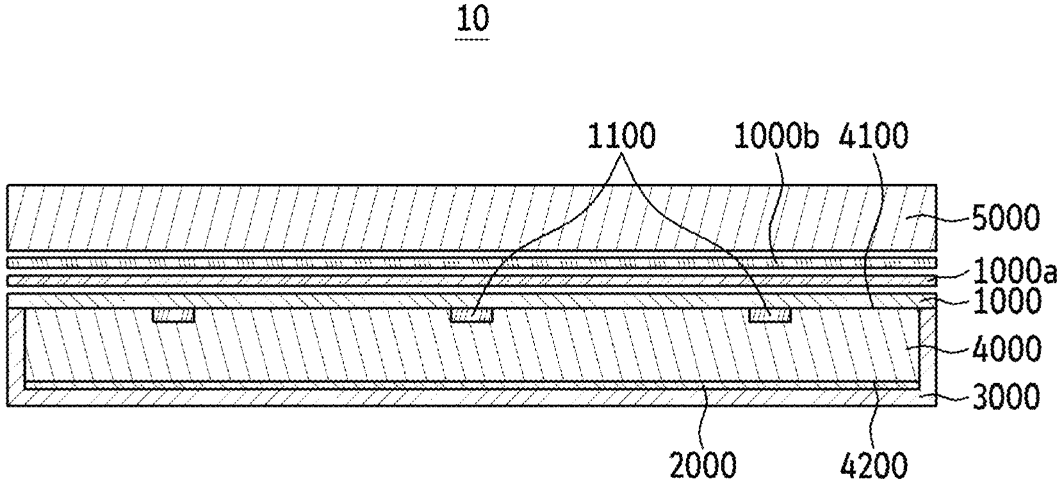
FIGS. 9 and 10 are cross-sectional views illustrating a phosphor sheet according to the first embodiment of the present disclosure.
Figure 10:
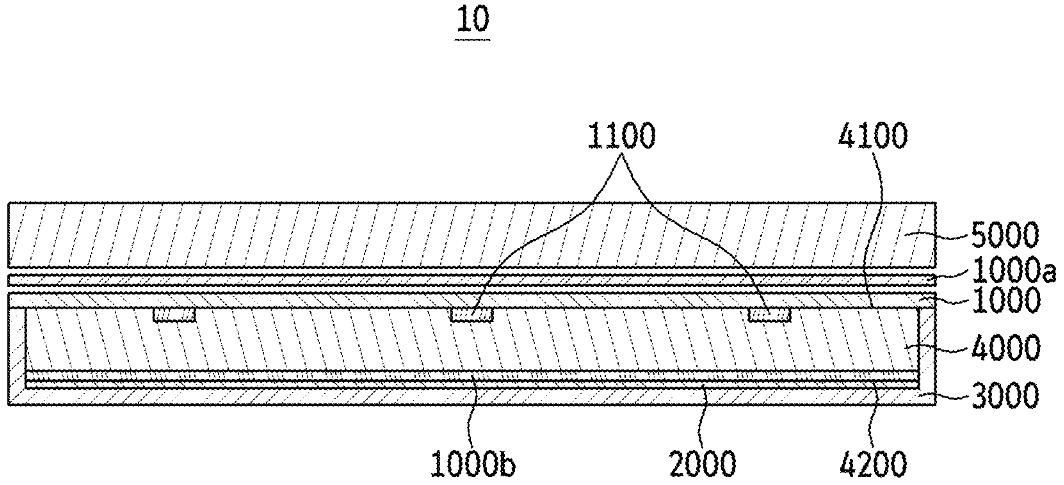

FIG. 9 illustrates an example where the phosphor sheet 1000*b* is disposed in front of the diffusion sheet 1000*a*, which is arranged in front of the substrate 1000, and FIG. 10 illustrates an example where the phosphor sheet 1000*b* is disposed in front of the deflection part 2000. However, the present disclosure is not limited to these examples. Alternatively, the phosphor sheet 1000*b* may be disposed at the rear of the substrate 1000 or the rear of the deflection part 2000.

The phosphor sheet 1000*b* may convert first light, which has a first wavelength range and is emitted from the first light sources 1100, into second light having a second wavelength range.

The phosphor sheet 1000*b* may include a phosphor material that generates the second light in the second wavelength range. In some embodiments, the phosphor sheet 1000*b* may include a phosphor material that is excited by the first light and generates third light in a third wavelength range. When the phosphor sheet 1000*b* includes the phosphor material that generates the third light, the second light may be understood as the resultant light that is generated by mixing, at a predetermined ratio, the first light that has passed through the phosphor sheet 1000*b* and the third light generated by the phosphor material.

The generation of the second light by mixing the first light and the third light through the phosphor sheet 1000*b* is intended to ensure that the phosphor content of the phosphor sheet 1000*b* is properly controlled. This prevents excessive phosphor content from hindering light transmission, which may adversely affect the efficiency of the phosphor sheet 1000*b*. Examples of such a phosphor sheet 1000*b* are described in U.S. Patent Publication No. 2023/0060919, which is incorporated herein by reference in its entirety.

Figure 11:
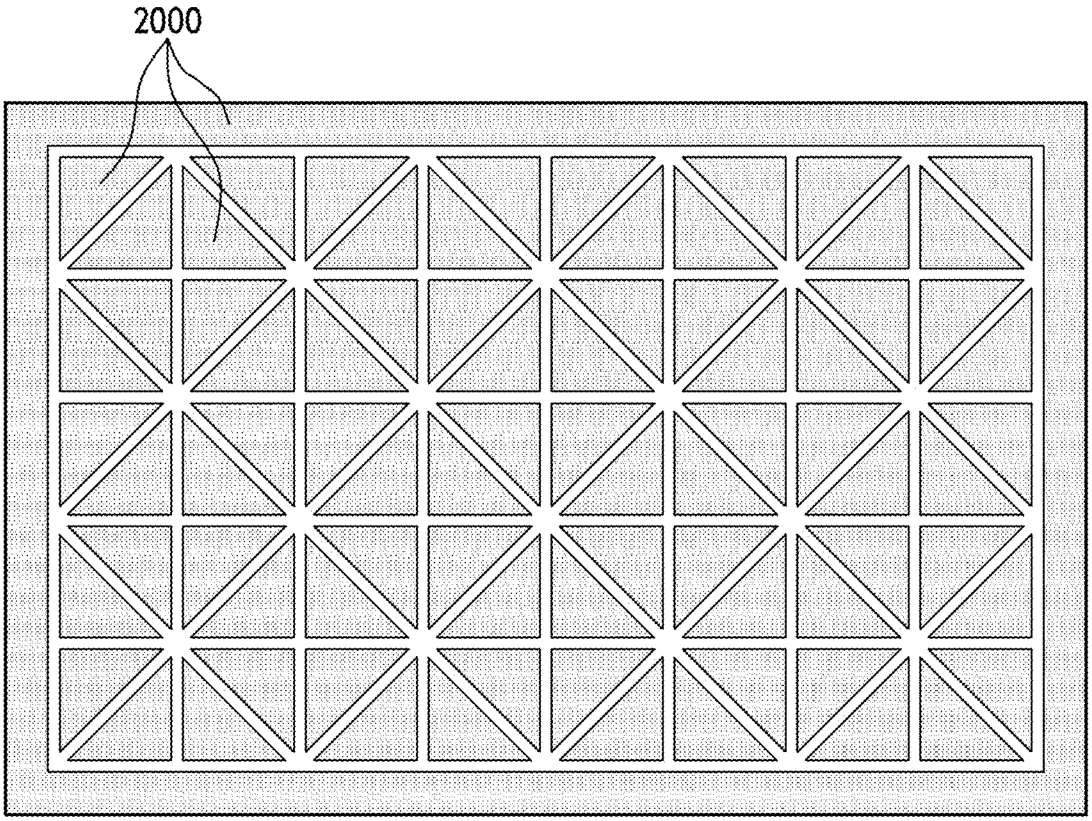
FIG. 11 is a schematic view illustrating a deflection part formed on the rear surface of a transmissive material according to the first embodiment of the present disclosure.

In the aforementioned first embodiment, the deflection part 2000 may be formed on the entire rear surface 4200 of the transmissive material 4000, but the present disclosure is not limited thereto. As illustrated in FIG. 11, some portions of the deflection part 2000 formed on the rear surface 4200 of the transmissive material 4000 may be removed, causing variations in brightness of light deflected in the second direction and enabling the formation of more diverse emission images. In other words, one or more openings (e.g., apertures or slits) may be included in the deflection part 2000.

Figure 12:
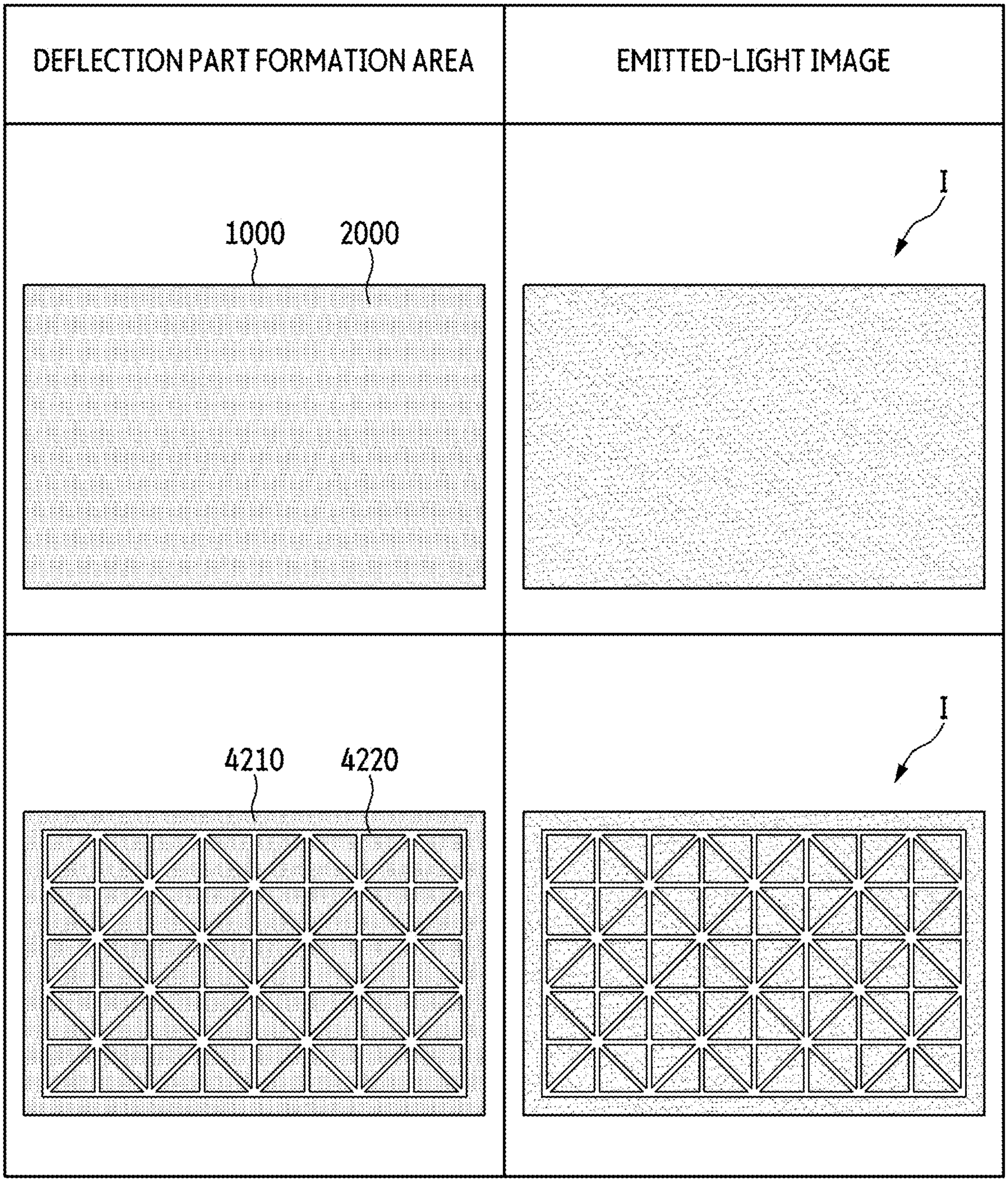
FIG. 12 is a schematic view illustrating an emission image corresponding to the region where the deflection part is formed on the rear surface of the transmissive material according to the first embodiment of the present disclosure.

As illustrated in FIG. 12, the rear surface 4200 of the transmissive material 4000 may include a first region 4210 where the deflection part 2000 is formed and a second region 4220 where no deflection part is formed. By adjusting the shape and position of the second region 4220, various emission images may be formed.

In other words, when the deflection part 2000 is formed on the entire rear surface 4200 of the transmissive material 4000, the light-emitting module 10 may form a substantially uniform and flat emission image I. However, when the deflection part 2000 is formed only in the first region 4210 of the rear surface 4200 of the transmissive material 4000, the shape, position, and other characteristics of the second region 4220, where no deflection part is formed, may create brightness differences between some areas in the emission image I. This feature can enhance the design aesthetics, as the brightness of the second region 4220 is relatively lower, thereby allowing for more diverse external design implementations.

Additionally, when the deflection part 2000 is configured as a reflective surface formed on the rear surface 4200 of the transmissive material 4000, the color of the emission image I may be varied depending on the color of the reflective surface. If the reflective surface is formed with two or more different colors, the emission image I may also exhibit two or more different colors, allowing for more diverse color implementations.

In other words, the color of the emission image I may be altered by the color of the deflection part 2000 without replacing the first light sources 1100 installed on the substrate 1000. This enables the shared use of the same substrate 1000 for different colors of emission images, reducing the need to manufacture separate substrates 1000 and thereby simplifying the manufacturing process and reducing the manufacturing cost.

Meanwhile, in the first embodiment of the present disclosure, the deflection part 2000 may be formed on at least a portion of the rear surface 4200 of the transmissive material 4000, but the present disclosure is not limited thereto. Alternatively, the deflection part 2000 may be formed not only on the rear surface 4200 of the transmissive material 4000 but also on at least a portion of the surface of the holder 3000 that faces the substrate 1000. A detailed description of this configuration will be provided later.

Figure 13:
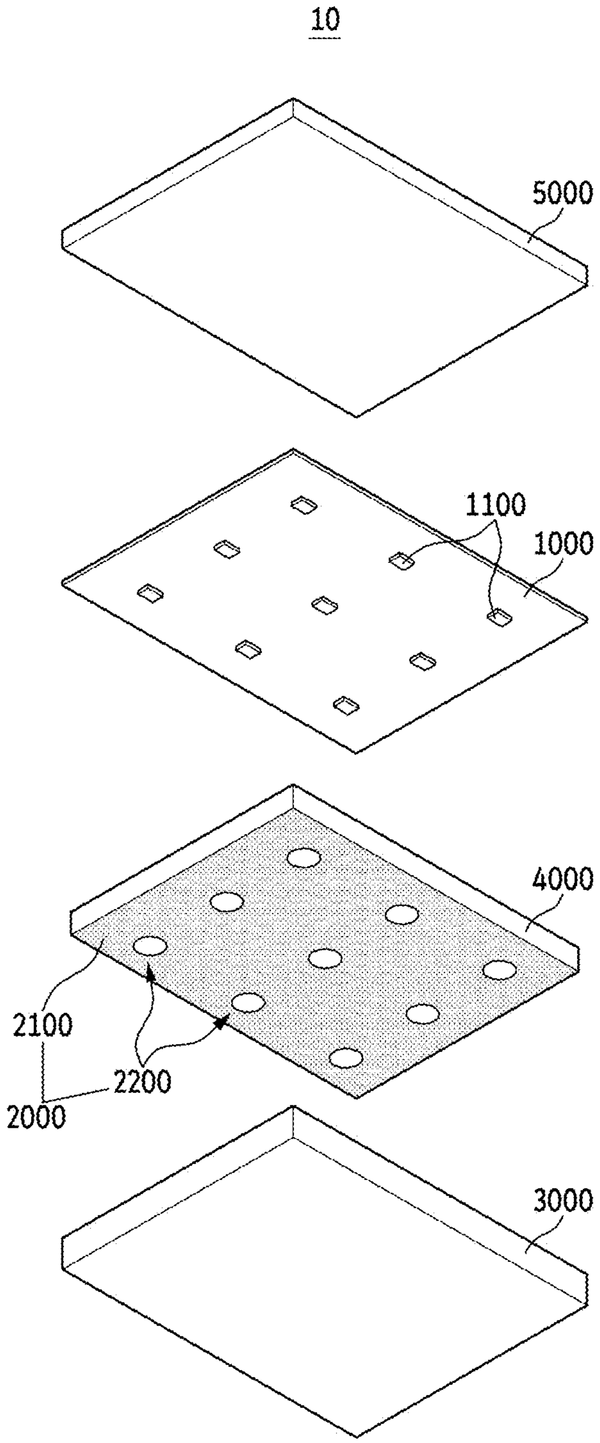
FIG. 13 is an exploded perspective view illustrating a light-emitting module according to a second embodiment of the present disclosure.
Figure 14:
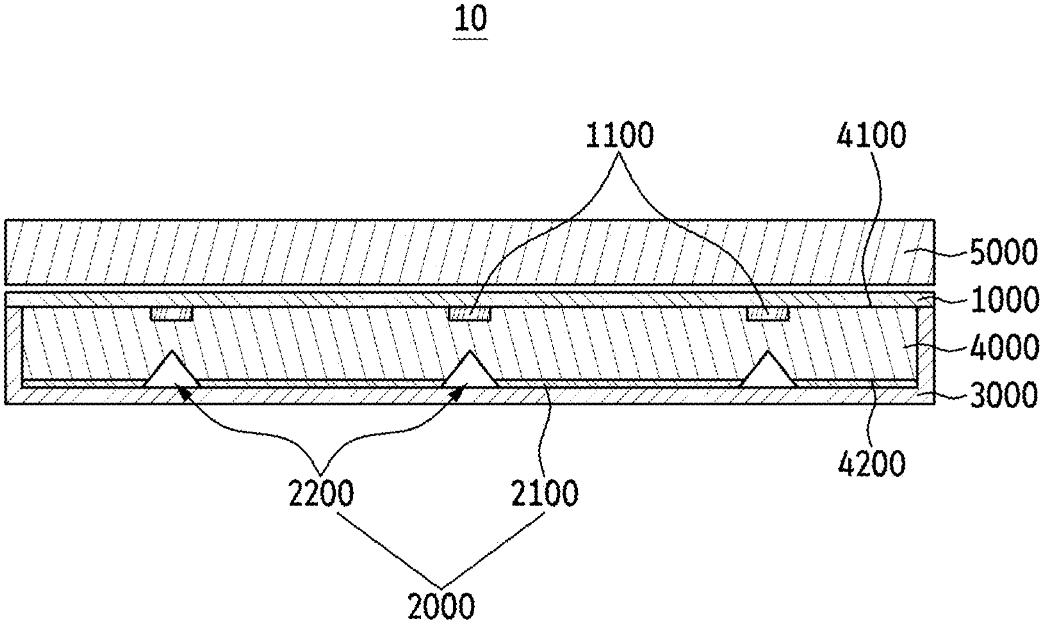
FIG. 14 is a cross-sectional view illustrating a light-emitting module according to the second embodiment of the present disclosure.

FIG. 13 is an exploded perspective view illustrating a light-emitting module according to a second embodiment of the present disclosure, and FIG. 14 is a cross-sectional view illustrating the light-emitting module according to the second embodiment of the present disclosure.

Referring to FIGS. 13 and 14, a light-emitting module 10 according to the second embodiment of the present disclosure, like its counterparts according to the previous embodiment, may include a substrate 1000 and a deflection part 2000. Components performing the same functions as those in the previous embodiment will be denoted by the same reference numerals, and detailed descriptions of their roles will be omitted.

In the second embodiment of the present disclosure, the deflection part 2000 may include a reflective surface 2100 formed on at least a portion of a rear surface 4200 of a transmissive material 4000. The deflection part 2000 may include a plurality of diffusion elements 2200, which are concavely recesses from the rear surface 4200 of the transmissive material 4000 toward the front surface thereof to deflect light emitted in the first direction from first light sources 1100 into the second direction.

In other words, in the second embodiment of the present disclosure, the deflection part 2000 may include the reflective surface 2100 and the diffusion elements 2200, whereas in the first embodiment of the present disclosure, the deflection part 2000 may include only the reflective surface 2100 without the diffusion elements 2200.

The diffusion elements 2200 may reflect or refract the light emitted in the first direction from the first light sources 1100 based on its angle of incidence, thereby diffusing the light.

The deflection of light in the second direction by the diffusion elements 2200 may be understood as reflecting or refracting the light into one or more directions that are different from the first direction depending on its angle of incidence.

In the second embodiment of the present disclosure, the diffusion elements 2200 may be disposed below (e.g., behind) the respective first light sources 1100, but the present disclosure is not limited thereto. The positions of the diffusion elements 2200 may be varied depending on the required degree of diffusion.

Additionally, in the second embodiment of the present disclosure, the first light sources 1100 and the diffusion elements 2200 may correspond in a one-to-one relationship, but the present disclosure is not limited thereto. The first light sources 1100 and the diffusion elements 2200 may correspond in a one-to-one, many-to-one, one-to-many, or many-to-many relationship.

Figure 15:
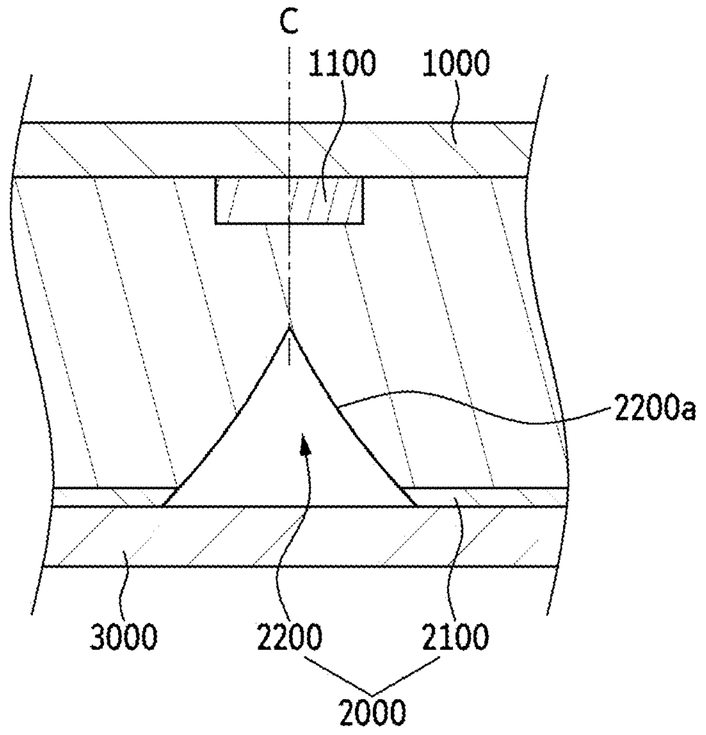
FIG. 15 is a schematic view illustrating a diffusion element according to the second embodiment of the present disclosure.

FIG. 15 is a schematic view illustrating a diffusion element according to the second embodiment of the present disclosure. FIG. 15 illustrates an exemplary diffusion element 2200 corresponding to one of the first light sources 1100 in FIG. 14.

Referring to FIG. 15, a diffusion element 2200 according to the second embodiment of the present disclosure may be formed to be axisymmetric about a central axis C of a first light source 1100. The central axis C may be understood as a line that passes vertically through the center of the emission surface of the first light source 1100.

The diffusion element 2200 may have a generally conical shape with its apex disposed at or near the central axis C of the first light source 1100. In the second embodiment of the present disclosure, side surface 2200*a* of the conical diffusion element 2200 may be formed with an inwardly concave curvature, thereby improving diffusion efficiency.

FIG. 15 illustrates an example where the side surfaces 2200*a* of the diffusion element 2200 are formed with an inwardly concave curvature, but the present disclosure is not limited thereto. The side surfaces 2200*a* of the diffusion element 2200 may be formed with a concave curvature, a convex curvature, or a combination thereof, depending on the path of diffusion desired by the diffusion element 2200.

Additionally, FIG. 15 illustrates an example where the apex of the diffusion element 2200 is disposed at the central axis C of the first light source 1100, but the present disclosure is not limited thereto. The position of the apex of the diffusion element 2200 may vary.

Figure 16:
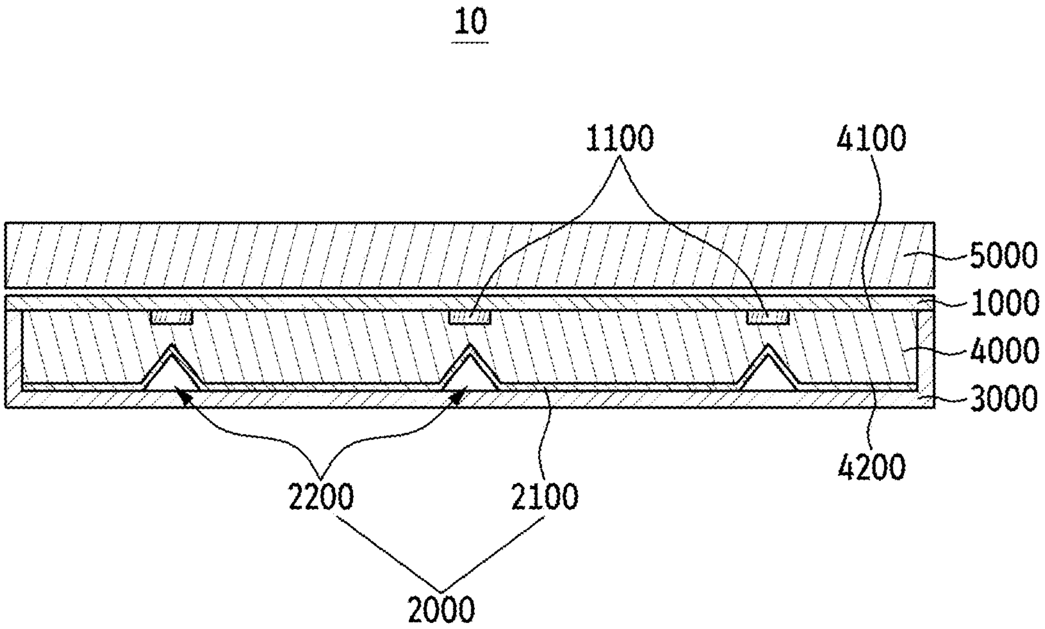
FIG. 16 is a cross-sectional view illustrating a reflective surface formed on the rear surface of a transmissive material according to the second embodiment of the present disclosure.

Meanwhile, in the second embodiment of the present disclosure, the reflective surface 2100 may be formed in the regions of the rear surface 4200 of the transmissive material 4000 where the diffusion elements 2200 are not formed, but the present disclosure is not limited thereto. Alternatively, as illustrated in FIG. 16, the reflective surface 2100 may be formed not only in the regions where the diffusion elements 2200 are absent but also on the diffusion elements 2200, as differences in the thickness of the air layer formed between the rear surface 4200 of the transmissive material 4000 and the holder 3000 may cause brightness irregularities and blemishes in the emission image to be formed by the light emitted externally from the light-emitting module 10.

In other words, in the regions of the rear surface 4200 of the transmissive material 4000 where the diffusion elements 2200 are formed and the regions of the rear surface 4200 of the transmissive material 4000 where the diffusion elements 2200 are not formed, different thicknesses of the air layers between the transmissive material 4000 and the surface of the holder 3000 facing the substrate 1000 may result in variations in the degree of light diffusion. The variations of light diffusion may lead to brightness differences in the emission image to be formed by the light emitted externally from the light-emitting module 10 and may cause blemishes. To address this potential problem, the reflective surface 2100 may be formed over the entire rear surface 4200 of the transmissive material 4000. However, if an emission image has a uniform brightness even with different thicknesses of air layers, the reflective surface 2100 may instead be selectively formed only in the areas where the plurality of diffusion elements 2200 are not formed, as illustrated in FIG. 15, to reduce the manufacturing cost.

Figure 17:
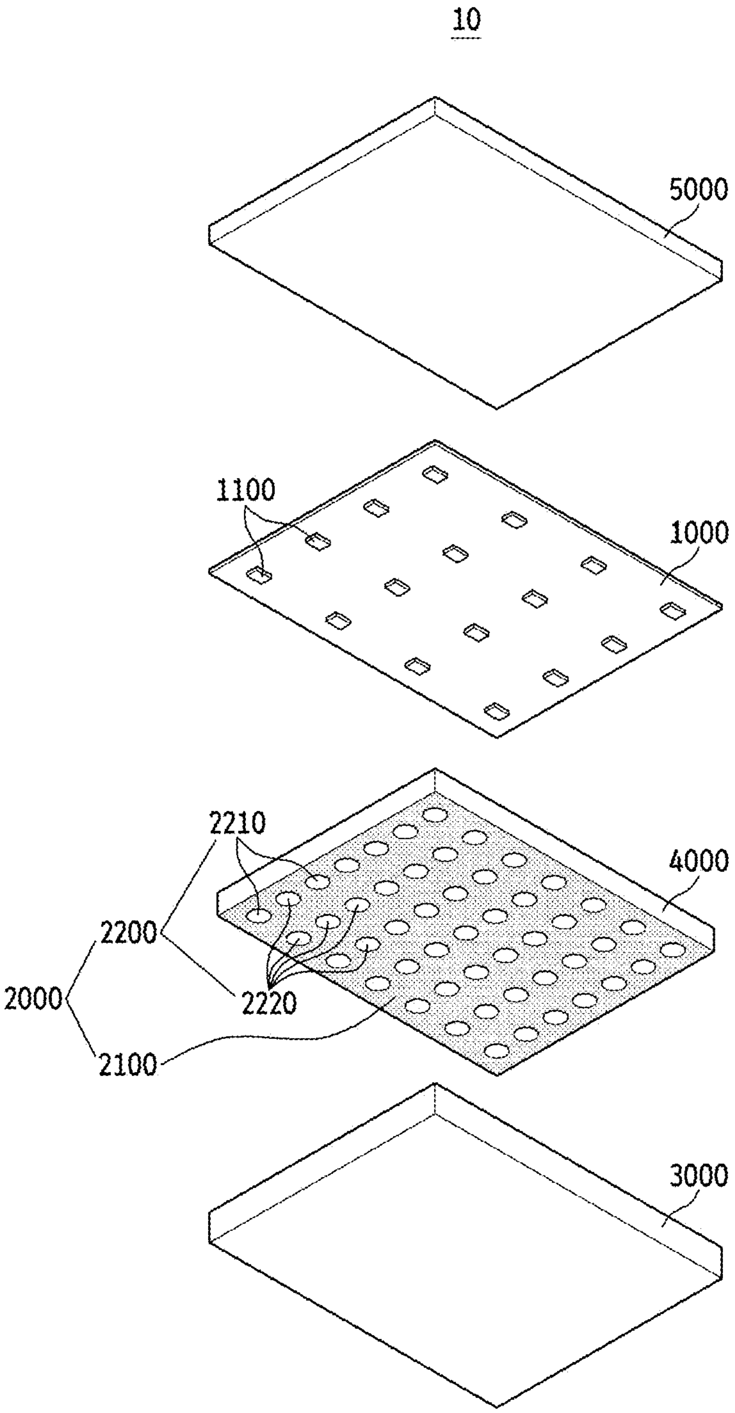
FIG. 17 is a perspective view illustrating a light-emitting module according to a third embodiment of the present disclosure.
Figure 18:
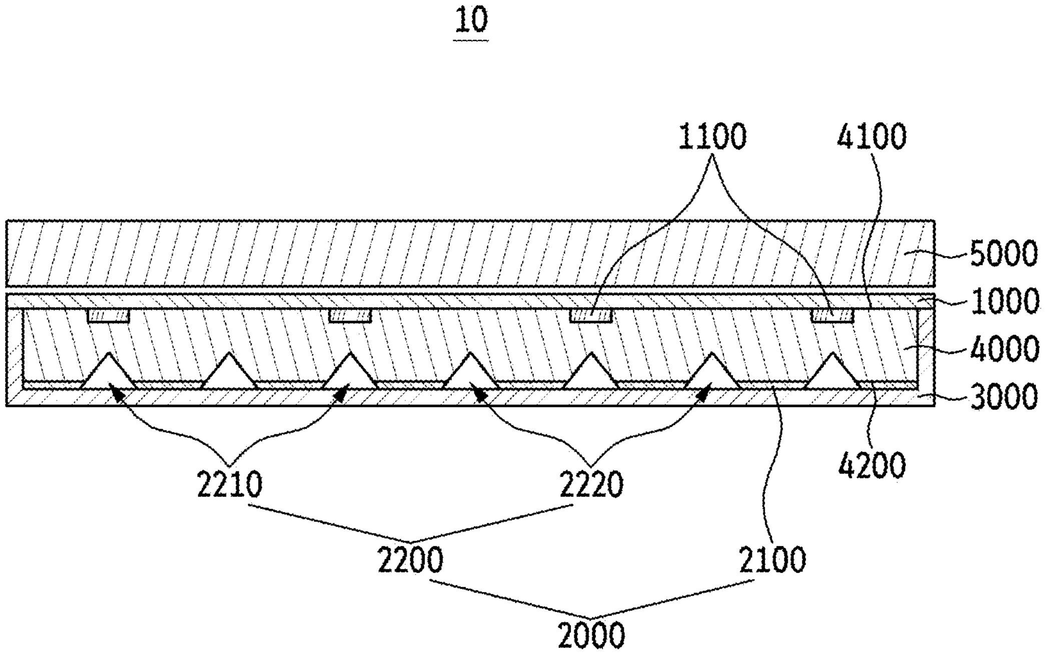
FIG. 18 is a cross-sectional view illustrating a light-emitting module according to the third embodiment of the present disclosure.
Figure 19:
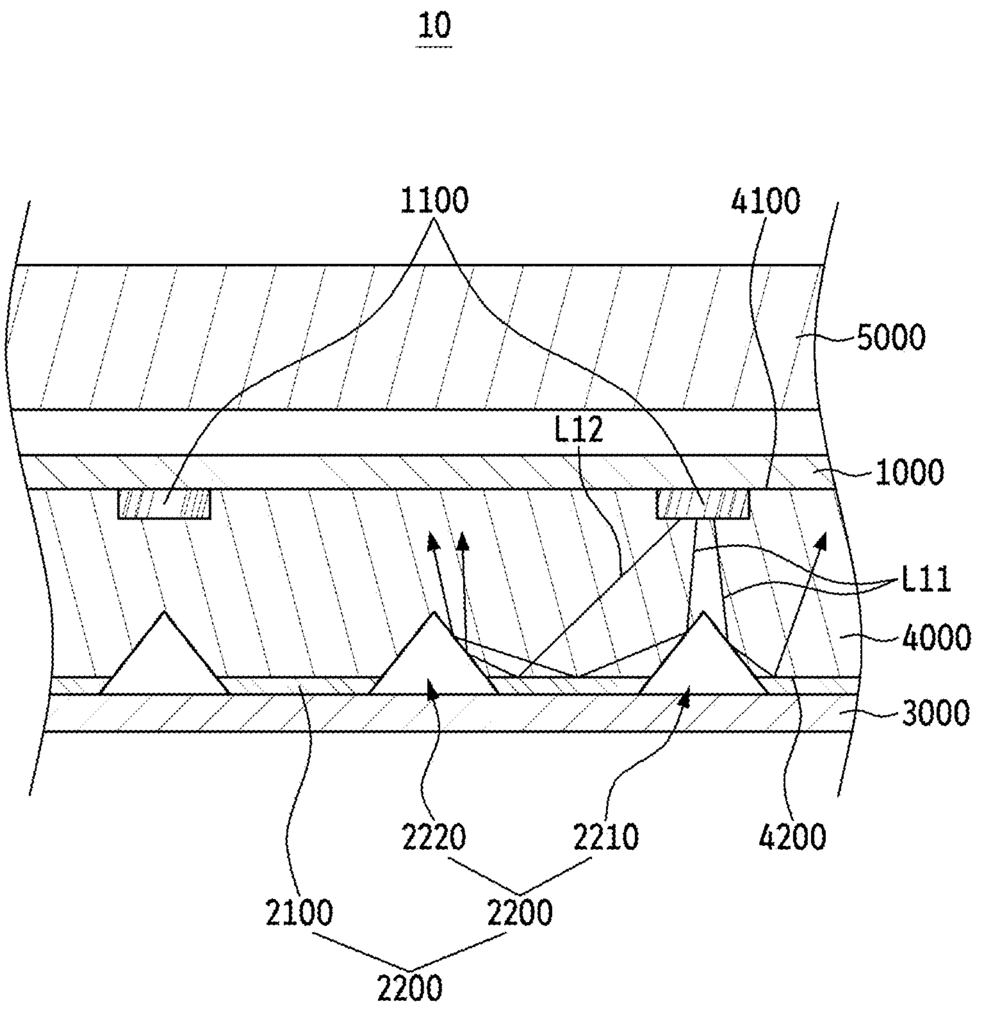
FIG. 19 is a schematic view illustrating an optical path of the light-emitting module according to the third embodiment of the present disclosure.

FIG. 17 is a perspective view illustrating a light-emitting module according to a third embodiment of the present disclosure, FIG. 18 is a cross-sectional view illustrating the light-emitting module according to the third embodiment of the present disclosure, and FIG. 19 is a schematic view illustrating the optical path of the light-emitting module according to the third embodiment of the present disclosure. FIGS. 17 through 19 illustrate an example where a deflection part 2000 includes a reflective surface 2100 and diffusion elements 2200.

Referring to FIGS. 17 through 19, a light-emitting module 10 according to the third embodiment of the present disclosure, like its counterparts according to the previous embodiments, may include a substrate 1000 and a deflection part 2000. Components performing the same functions as those in the previous embodiments will be denoted by the same reference numerals, and detailed descriptions of their roles will be omitted.

In the third embodiment of the present disclosure, a plurality of diffusion elements 2200 may include a plurality of first diffusion patterns 2210, which correspond to a plurality of first light sources 1100, and a plurality of second diffusion patterns 2220, which are formed between adjacent first diffusion patterns 2210.

The first diffusion patterns 2210 may allow light L11, which is emitted in a first direction from the respective first light sources 1100, to be reflected or refracted depending on its angle of incidence. The second diffusion patterns 2220 may be formed between the adjacent first diffusion patterns 2210 and may diffuse light L12 that proceeds to regions other than the first diffusion patterns 2210 through reflection or refraction after being emitted from the first light sources 1100. Additionally, at least a portion of the light reflected or refracted by the first diffusion patterns 2210 may be further reflected or refracted by the second diffusion patterns 2220, thereby enhancing diffusion efficiency and reducing unnecessary shadow regions that may occur between the adjacent first light sources 1100.

Figure 20:
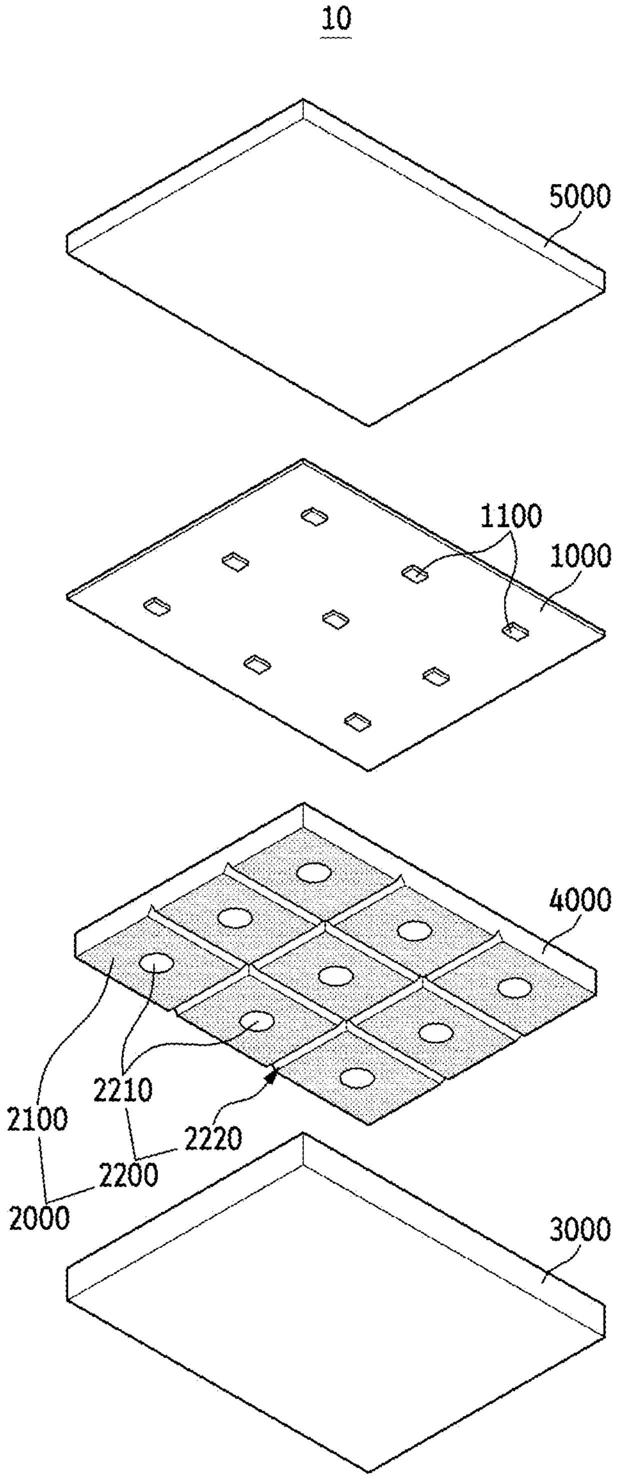
FIG. 20 is a perspective view illustrating second diffusion patterns formed in a partition-wall shape according to the third embodiment of the present disclosure.

In the third embodiment of the present disclosure, the second diffusion patterns 2220, similar to the first diffusion patterns 2210, may be spaced apart from one another at a predetermined interval, but the present disclosure is not limited thereto. Alternatively, as illustrated in FIG. 20, the second diffusion patterns 2220 may be implemented in the form of partition walls that are connected between the adjacent first diffusion patterns 2210 in at least one direction.

In FIGS. 17 through 20, the reflective surface 2100 may be formed in the regions of a rear surface 4200 of a transmissive material 4000 where neither the first diffusion patterns 2210 nor the second diffusion patterns 2220 are present, but the present disclosure is not limited thereto. Alternatively, as mentioned earlier with reference to FIG. 16, the reflective surface 2100 may be formed on the first diffusion patterns 2210 and/or the second diffusion patterns 2220.

Meanwhile, in the third embodiment of the present disclosure, the second diffusion patterns 2220 may help reduce shadow regions that can be potentially formed between the adjacent first light sources 1100. However, the present disclosure is not limited thereto, and the second diffusion patterns 2220 may allow the light-emitting module 10 to be configured to serve two or more different functions simultaneously.

Figure 21:
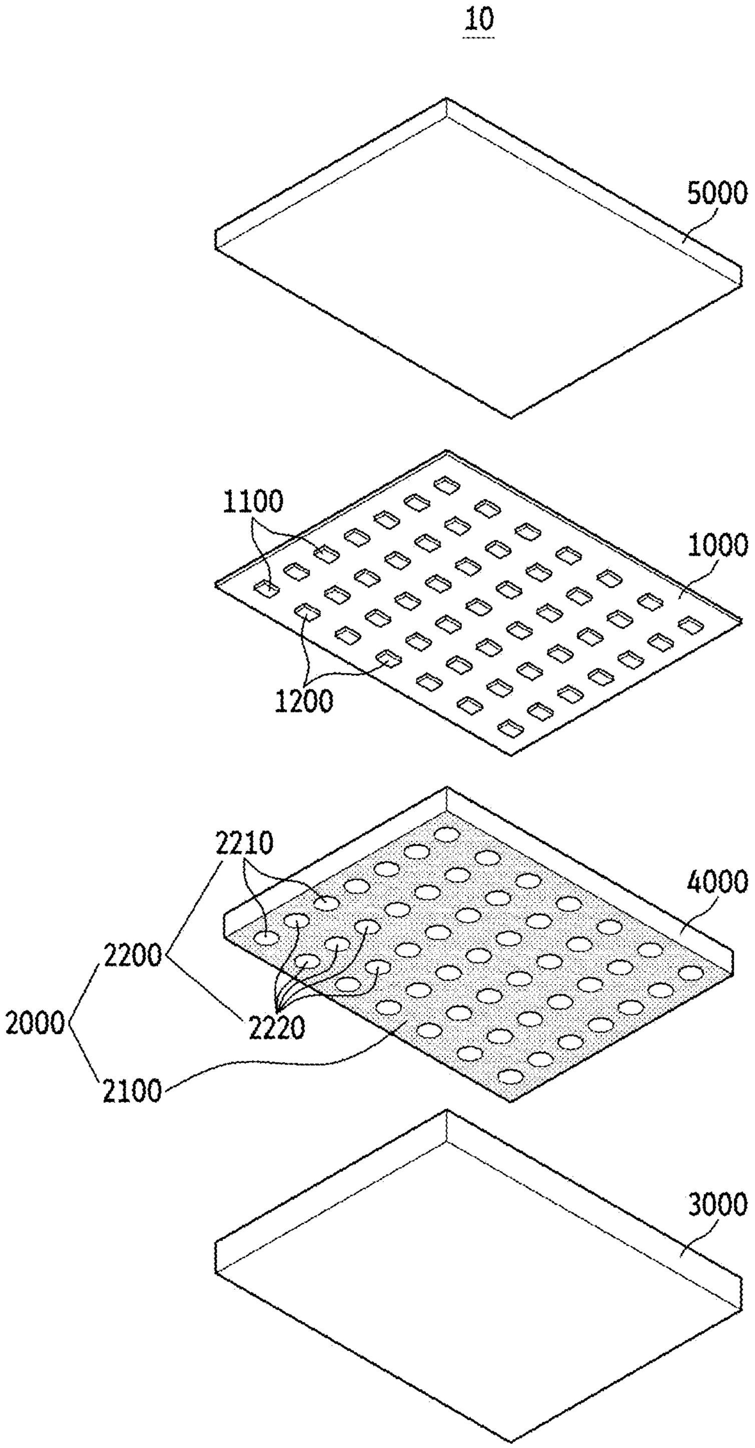
FIG. 21 is an exploded perspective view illustrating a light-emitting module according to a fourth embodiment of the present disclosure.
Figure 22:
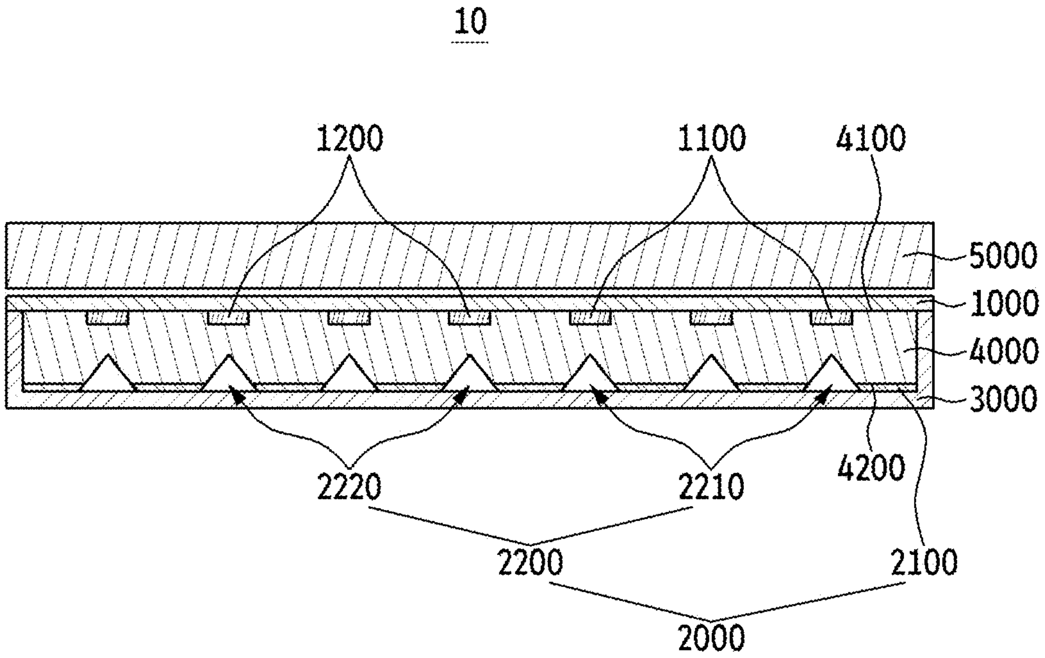
FIG. 22 is a cross-sectional view illustrating the light-emitting module according to the fourth embodiment of the present disclosure.

FIG. 21 is an exploded perspective view illustrating a light-emitting module according to a fourth embodiment of the present disclosure, and FIG. 22 is a cross-sectional view illustrating the light-emitting module according to the fourth embodiment of the present disclosure.

Referring to FIGS. 21 and 22, a light-emitting module 10 according to the fourth embodiment of the present disclosure, like its counterparts according to the previous embodiments, may include a substrate 1000 and a deflection part 2000. Components performing the same functions as those in the previous embodiments will be denoted by the same reference numerals, and detailed descriptions of their roles will be omitted.

In the fourth embodiment of the present disclosure, not only a plurality of first light sources 1100, but also a plurality of second light sources 1200 may be installed on the rear surface of a substrate 1000, and the plurality of second light sources 1200 may be disposed between adjacent first light sources 1100. The first light sources 1100 and the second light sources 1200 may be alternately arranged in at least one direction, and a plurality of first diffusion patterns 2210 may be formed to correspond to the first light sources 1100, and a plurality of second diffusion patterns 2220 may be formed to correspond to the second light sources 1200.

The inclusion of both the first light sources 1100 and the second light sources 1200 on the rear surface of the substrate 1000 may allow the light-emitting module 10 to be used for multiple functions.

For example, in case the first light sources 1100 emit white light and the second light sources 1200 emit amber light, the light-emitting module 10 may serve as a daytime running lamp (DRL) when the second light sources 1200 are turned off and only the first light sources 1100 are turned on. On the other hand, the light-emitting module 10 may serve as a turn signal lamp when the first light sources 1100 are turned off and only the second light sources 1200 are turned on.

Additionally, if the first light sources 1100 emit red light and the second light sources 1200 emit amber light, the light-emitting module 10 may serve as a brake lamp when the second light sources 1200 are turned off and only the first light sources 1100 are turned on. On the other hand, the light-emitting module 10 may serve as a turn signal lamp when the first light sources 1100 are turned off and only the second light sources 1200 are turned on.

In the fourth embodiment of the present disclosure, either the first light sources 1100 or the second light sources 1200 may be turned on, depending on the function of the light-emitting module 10, but the present disclosure is not limited thereto. Alternatively, the first light sources 1100 and the second light sources 1200 may both be turned on concurrently. In this case, the intensity of light emitted from both the first light sources 1100 and the second light sources 1200 may be controlled to mix the colors of the emitted light, enabling a more diverse range of colors and extension of the functional applications of the light-emitting module 10.

In the fourth embodiment of the present disclosure, the light-emitting module 10 may emit two different colors of light using the first light sources 1100 and the second light sources 1200, but the present disclosure is not limited thereto. Alternatively, the substrate 1000 may be equipped with three or more sets of light sources that emit different colors of light.

In the following description, a plurality of first light sources 1100 will be described as being installed on a substrate 1000, but the present disclosure is not limited thereto. The present disclosure may also be applicable to a case where a plurality of first light sources 1100 and a plurality of second light sources 1200 are both installed on a substrate 1000.

In the previous embodiments, the reflective surface 2100 may be formed on at least a portion of the rear surface 4200 of the transmissive material 4000, but the present disclosure is not limited thereto. Alternatively, a material with high reflectivity, such as aluminum or chromium, may be deposited or coated on at least a portion of the surface of the holder 3000 that faces the substrate 1000, or a high-reflectivity paint, such as white paint, may be applied onto at least a portion of the surface of the holder 3000 that faces the substrate 1000, allowing at least a portion of the light emitted in the first direction from the first light sources 1100 to be deflected in the second direction.

Figure 23:
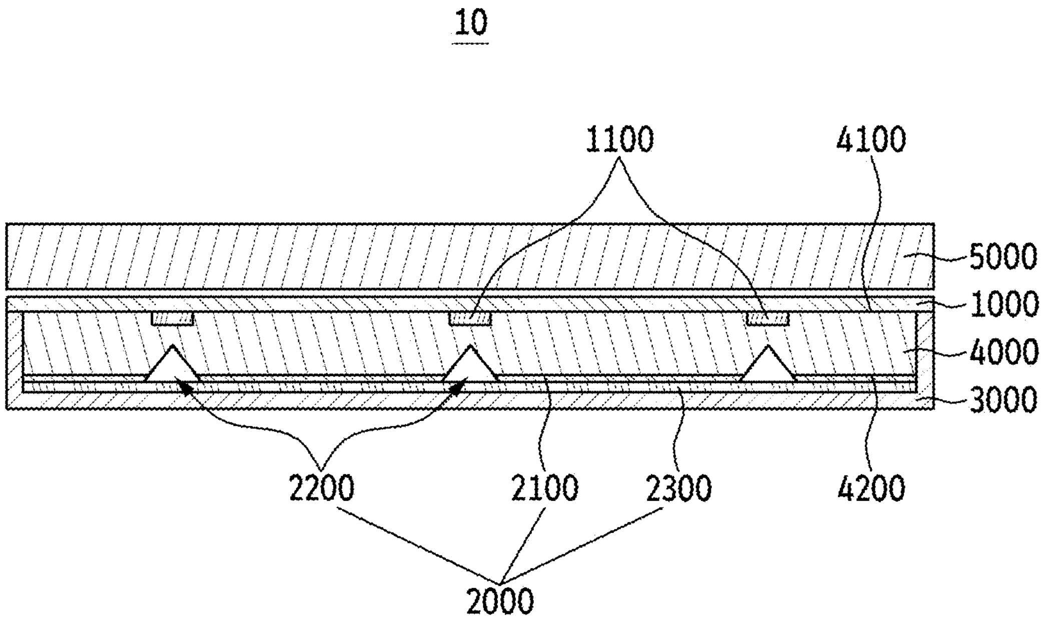
FIGS. 23 and 24 are cross-sectional views illustrating a light-emitting module according to a fifth embodiment of the present disclosure.
Figure 24:
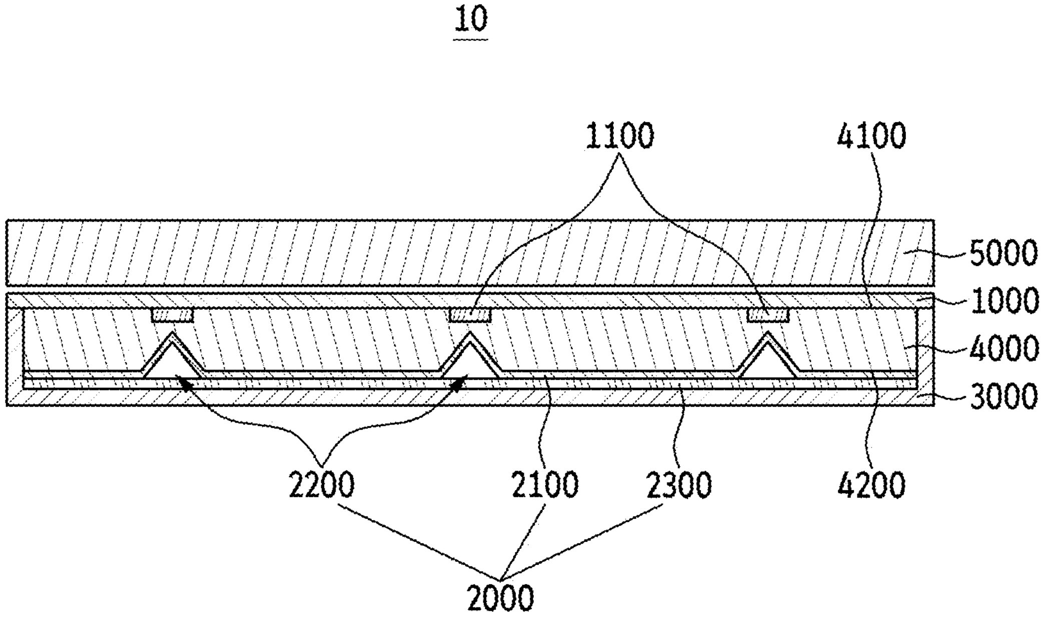

FIGS. 23 and 24 are cross-sectional views illustrating a light-emitting module according to a fifth embodiment of the present disclosure of the present disclosure.

Referring to FIGS. 23 and 24, a light-emitting module 10 according to the fifth embodiment of the present disclosure, like its counterparts in the previous embodiments, may include a substrate 1000 and a deflection part 2000. Components performing the same functions as those in the previous embodiments will be denoted by the same reference numerals, and detailed descriptions of their roles will be omitted.

In the fifth embodiment of the present disclosure, the deflection part 2000 may include a reflective surface 2100 and a plurality of diffusion elements 2200, and may further include a reflective layer 2300 formed on at least a portion of the surface of a holder 3000 that faces the substrate 1000. The reflective layer 2300 may enhance light reflection efficiency.

In other words, when no reflective surface is formed on the diffusion elements 2200, as illustrated in FIG. 23, or even when the reflective surface 2100 is formed on the diffusion elements 2200, as illustrated in FIG. 24, some light may still pass through the diffusion elements 2200, leading to light loss. To address this issue, the reflective layer 2300 may be formed on at least a portion of the surface of the holder 3000 facing the substrate 1000, so that the light that passes through the diffusion elements 2200 or the reflective surface 2100 may be redirected toward the substrate 1000, thereby improving light efficiency.

The reflective layer 2300, similar to the reflective surface 2100, may be formed by depositing or coating a high-reflectivity material such as aluminum or chromium on at least a portion of the surface of the holder 3000 facing the substrate 1000. Alternatively, a high-reflectivity paint, such as white paint, may be applied, or a separate film-type reflective layer may be formed and attached to the holder 3000.

In embodiments where the deflection part 2000 includes the reflective surface 2100, the diffusion elements 2200, and the reflective layer 2300, not only portions of the reflective surface 2100 may be removed from the rear surface 4200 of the transmissive material 4000, as illustrated in FIG. 12, to form various designs of emission images, but also portions of the reflective layer 2300 may be removed from the holder 3000 to form various designs of emission images. In other words, one or more openings (e.g., apertures or slits) may be included in the reflective surface 2100 and/or the reflective layer 2300.

Meanwhile, the reflective surface 2100 and the reflective layer 2300 may be formed with different colors so that each emission image may exhibit a variety of colors.

For example, if the reflective surface 2100 is formed with a white color and the reflective layer 2300 is formed with a red or amber color, the light reflected by the reflective surface 2100 and the light reflected by the reflective layer 2300 may be combined, allowing for a wider range of emission image colors. As a result, the manufacturing process can be simplified, and the manufacturing cost can be reduced.

In other words, without replacing a plurality of first light sources 1100 installed on a substrate 1000, the color of each emission image may be changed based on the combination of the colors of beams of light reflected by the reflective surface 2100 and the reflective layer 2300. This allows for the shared use of a single substrate 1000 without the need for the production of separate substrates 1000 for different emission image colors, thereby reducing the manufacturing process and lowering the cost.

Meanwhile, in the previous embodiments, examples have been described where the deflection part 2000 includes (i) only the reflective surface 2100, (ii) both the reflective surface 2100 and the diffusion elements 2200, or (iii) all of the reflective surface 2100, the diffusion elements 2200, and the reflective layer 2300. However, the present disclosure is not limited thereto, and the deflection part 2000 may include at least one of the reflective surface 2100, the diffusion elements 2200, or the reflective layer 2300, depending on the required emission characteristics of the light-emitting module 10, such as luminous intensity and brightness uniformity. Even if the deflection part 2000 includes only the reflective layer 2300, similar to the case where only the reflective surface 2100 is formed, the color of each emission image may be selected by adjusting the color of the reflective layer 2300, and portions of the reflective layer 2300 may be removed to form various designs of emission images.

Figure 25:
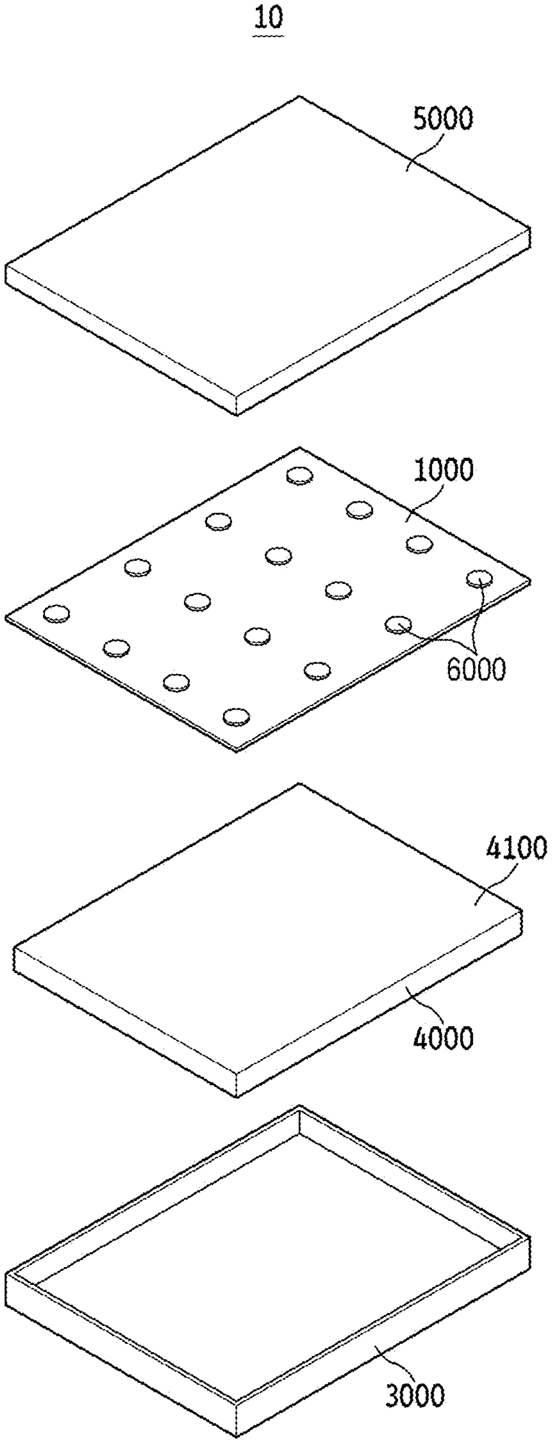
FIG. 25 is a perspective view illustrating a light-emitting module according to a sixth embodiment of the present disclosure.
Figure 26:
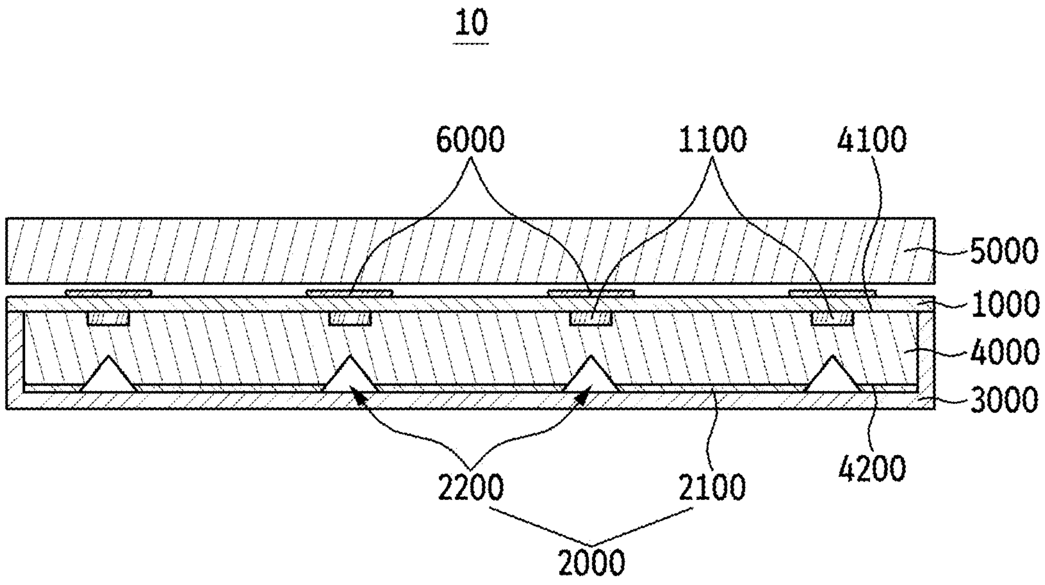
FIG. 26 is a cross-sectional view illustrating the light-emitting module according to the sixth embodiment of the present disclosure.

FIG. 25 is an exploded perspective view illustrating a light-emitting module according to a sixth embodiment of the present disclosure, and FIG. 26 is a cross-sectional view illustrating the light-emitting module according to the sixth embodiment of the present disclosure.

Referring to FIGS. 25 and 26, a light-emitting module 10 according to the sixth embodiment of the present disclosure, like its counterparts in the previous embodiments, may include a substrate 1000 and a deflection part 2000. Components performing the same functions as those in the previous embodiments will be denoted by the same reference numerals, and detailed descriptions of their roles will be omitted.

Figure 27:
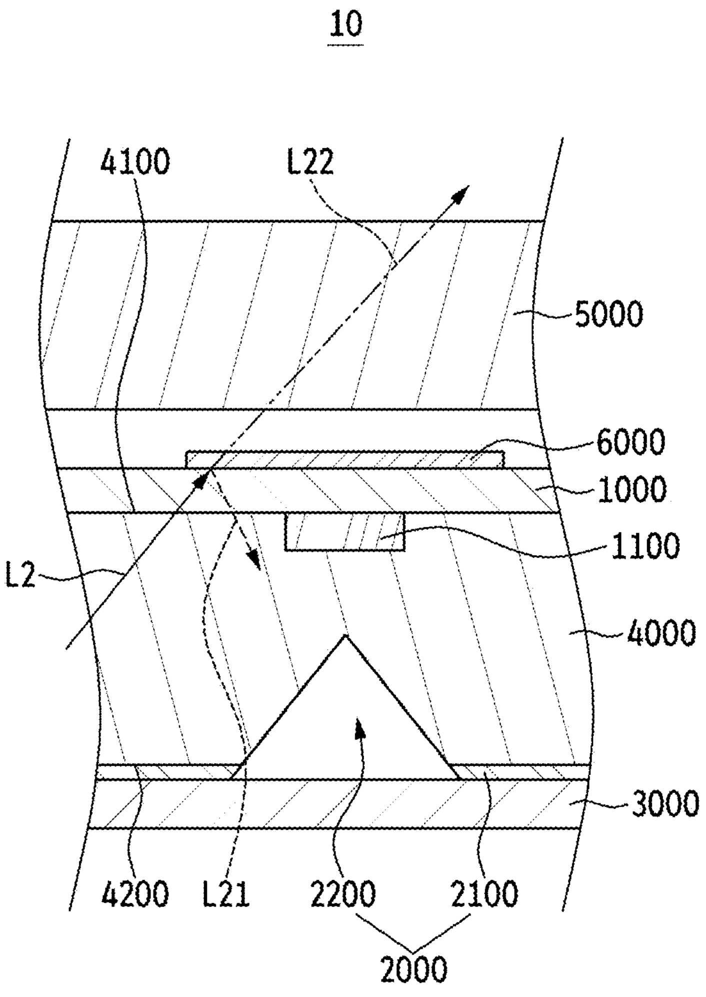
FIG. 27 is a schematic view illustrating an optical path affected by a light diffusion layer according to the sixth embodiment of the present disclosure.

In the sixth embodiment of the present disclosure, a plurality of light diffusion layers 6000 may be disposed to overlap a plurality of first light sources 1100 at least partially. As illustrated in FIG. 27, each light diffusion layer 6000 may reflect a portion of light L2, which is deflected in a second direction by at least one of a reflective surface 2100 or a plurality of diffusion elements 2200, i.e., light L21, while allowing the rest of the light L2, i.e., light L22, to pass through. The light L21 reflected by the light diffusion layer 6000 may be further deflected by at least one of the reflective surface 2100 or the diffusion elements 2200, thereby ensuring that the light emitted from the light-emitting module 10 has overall uniform brightness.

The light diffusion layers 6000 may be formed as coating layers of a highly reflective white paint that reflects a portion of the light deflected toward the vicinity of the respective first light sources 1100 while allowing the rest of the deflected light to pass through, but the present disclosure is not limited thereto. Alternatively, the light diffusion layers 6000 may be formed as separate films attached to the light-emitting module 10.

In the sixth embodiment of the present disclosure, the light diffusion layers 6000 may be formed on the front surface of the substrate 1000, but the present disclosure is not limited thereto. The light diffusion layers 6000 may be formed on at least one of the front surface or the rear surface of the substrate 1000, or on at least one of the front surfaces or rear surfaces of other light-transmitting components such as a diffusion sheet 1000*a* or a cover 5000.

The light diffusion layers 6000 may preferably have a size that is 1 to 6 times the size of the first light sources 1100. If the light diffusion layers 6000 are smaller than the first light sources 1100, diffusion may become ineffective, whereas if the light diffusion layers 6000 are larger than six times the size of the first light sources 1100, light efficiency may be deteriorated.

As illustrated in FIG. 27, the light diffusion layers 6000 may not only serve to ensure uniform brightness of emitted light by reflecting and transmitting a portion of the light L2 deflected in the second direction but may also improve shadow regions that may be formed due to the rear surfaces of the first light sources 1100 when viewed from the front of the substrate 1000.

In other words, when the first light sources 1100 are installed on the rear surface of the substrate 1000, the light-emitting surfaces of the first light sources 1100 may be oriented rearward rather than forward. Consequently, when viewed from the front of the substrate 1000, shadow regions may be visible due to the exposure of the back side of the first light sources 1100. However, in the sixth embodiment of the present disclosure, the use of the light diffusion layers 6000, which have a white color, can mitigate the effects of the shadow regions caused by the rear surfaces of the first light sources 1100.

Figure 28:
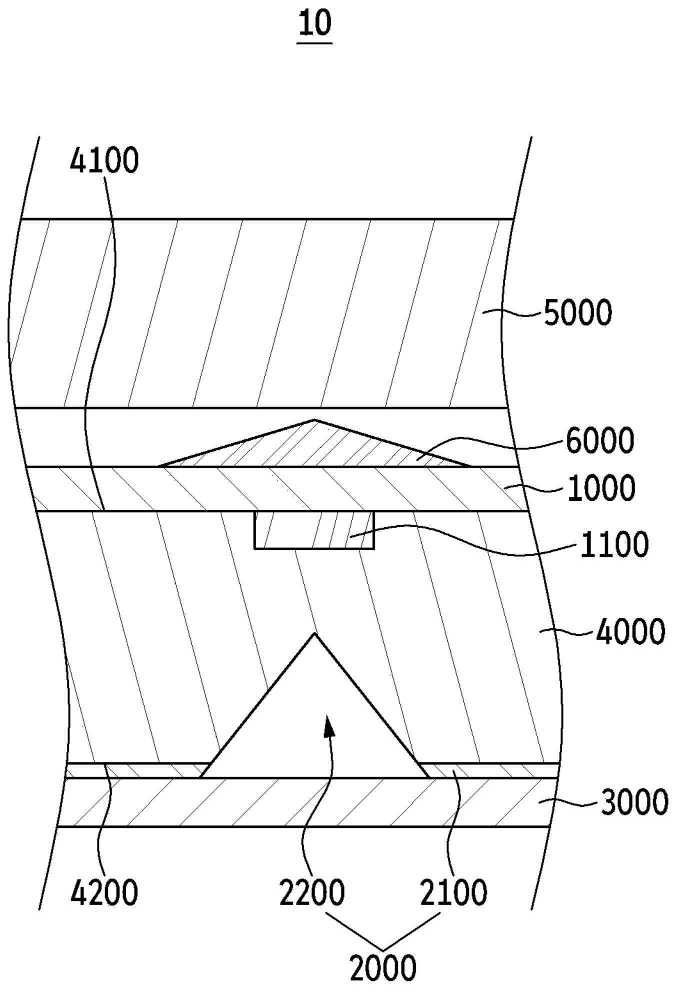
FIGS. 28 and 29 are schematic views illustrating the structure of a light diffusion layer according to the sixth embodiment of the present disclosure.
Figure 29:
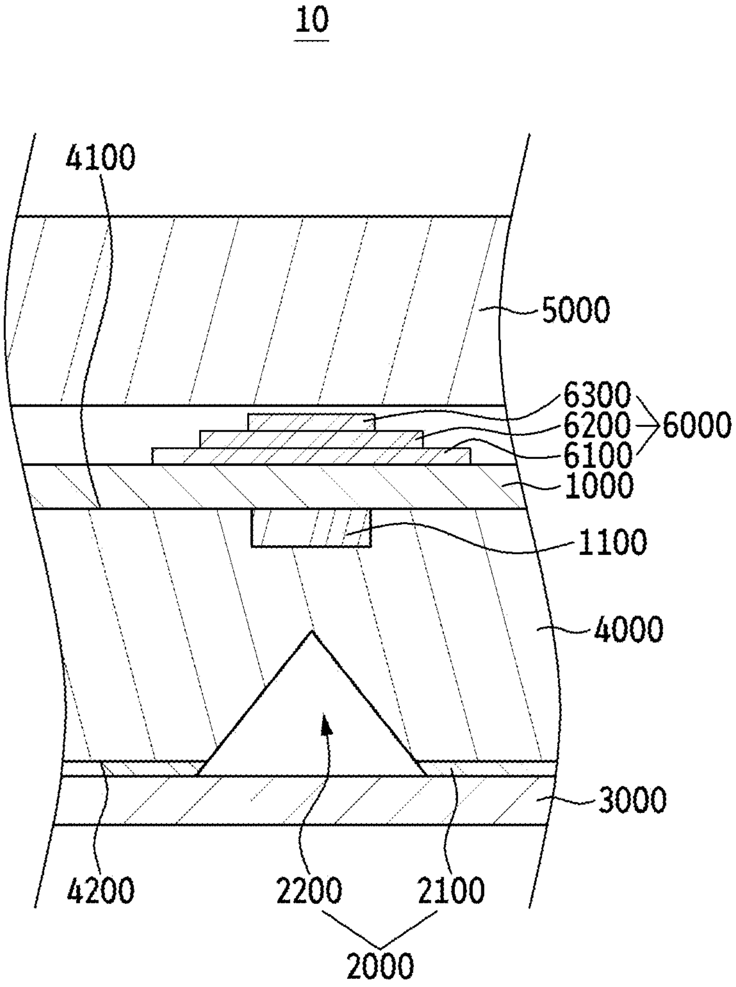

As illustrated in FIGS. 28 and 29, the light diffusion layers 6000 may be formed to have a greater thickness closer to the centers of the respective first light sources 1100. When the first light sources 1100 are installed on the rear surface of the substrate 1000, their light-emitting surfaces are directed rearward rather than forward. As a result, when viewed from the front of the substrate 1000, shadow regions may be visible due to the rear surfaces of the first light sources 1100. Therefore, by increasing the thickness of the light diffusion layers 6000 toward the centers of the respective first light sources 1100, dark patterns can be more effectively prevented from being visible from the front of the substrate 1000.

The light diffusion layers 6000 may become thinner going away from the centers of the respective first light sources 1100 since if the light diffusion layers 6000 maintain a uniform thickness corresponding to the centers of the first light sources 1100, the overall diffusion efficiency of light may decrease, potentially reducing light efficiency.

FIG. 28 illustrates an example where the light diffusion layers 6000 are formed as single layers that gradually decrease in thickness from the centers toward the edges (e.g., peripheral edges) of the respective first light sources 1100. On the other hand, FIG. 29 illustrates an example where each of the light diffusion layers 6000 includes a stack of multiple layers 6100, 6200, and 6300. In each stack, among the multiple layers 6100, 6200, and 6300, each layer may be formed to have a smaller dimension than the layers below it in at least one direction relative to the centers of the respective first light sources 1100. As a result, the closer to the centers of the first light sources 1100, the thicker the light diffusion layers 6000 may become.

In FIGS. 28 and 29, the light diffusion layers 6000 may be formed to become thicker toward the centers of the respective first light sources 1100 since darker patterns tend to form near the centers of the first light sources 1100.

Figure 30:
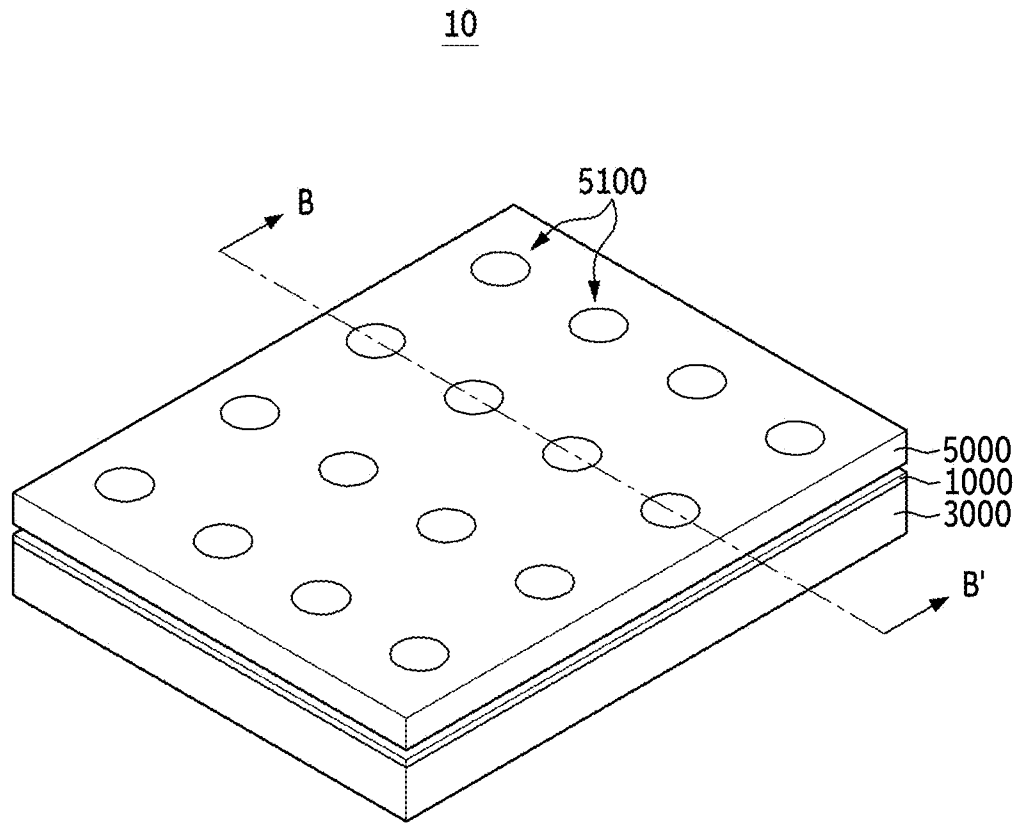
FIG. 30 is a perspective view illustrating a light-emitting module according to a seventh embodiment of the present disclosure.
Figure 31:
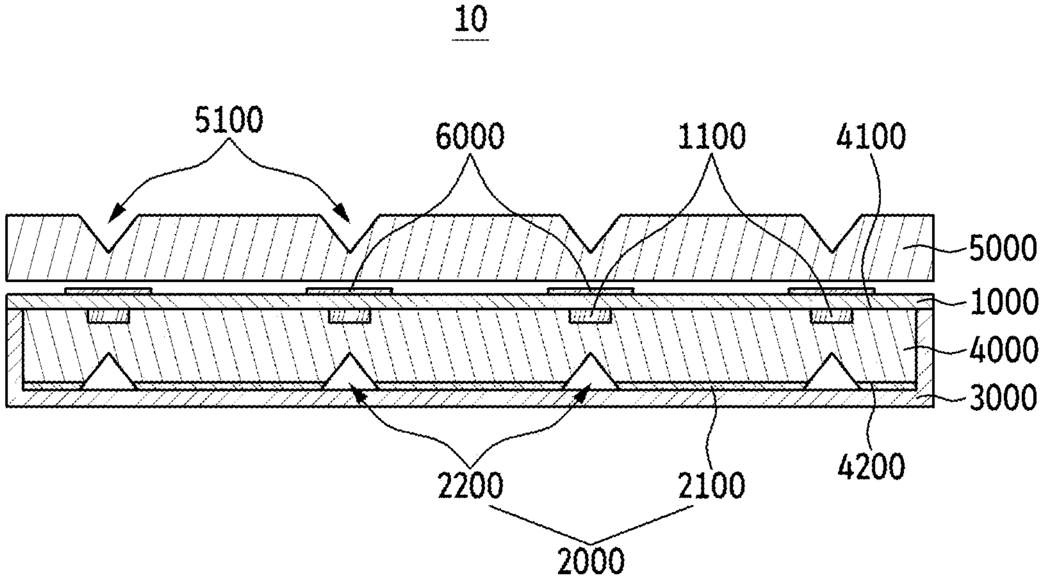
FIG. 31 is a cross-sectional view taken along line B-B' of FIG. 30.

FIG. 30 is a perspective view illustrating a light-emitting module according to a seventh embodiment of the present disclosure, and FIG. 31 is a cross-sectional view taken along line B-B' of FIG. 30.

Referring to FIGS. 30 and 31, a light-emitting module 10 according to the seventh embodiment of the present disclosure, like its counterparts in the previous embodiments, may include a substrate 1000 and a deflection part 2000. Components performing the same functions as those in the previous embodiments will be denoted by the same reference numerals, and detailed descriptions of their roles will be omitted.

In the seventh embodiment of the present disclosure, a cover 5000 may include a plurality of optical elements 5100 that are formed with a concave shape at positions respectively corresponding to a plurality of first light sources 1100. The optical elements 5100 may mitigate potential shadow regions that may occur due to the first light sources 1100 being installed on the rear surface of the substrate 1000.

The optical elements 5100 may be formed on at least one of the front surface or rear surface of the cover 5000. When the light emitted in a first direction from the first light sources 1100 is deflected in a second direction by the deflection part 2000 to be transmitted through the substrate 1000, the optical elements 5100 may deflect a portion of the transmitted light. As a result, the brightness in the regions corresponding to the first light sources 1100 may be increased. This feature, along with the light diffusion layers 6000 described in the sixth embodiment of the present disclosure, can help mitigate the shadow regions potentially caused by the first light sources 1100.

FIGS. 30 and 31 illustrate an example where the light diffusion layers 6000 are formed at the positions corresponding to the first light sources 1100 on the front surface of the substrate 1000, and where concave optical elements 5100 are formed at the positions corresponding to the first light sources 1100 on the front surface of the cover 5000. However, the present disclosure is not limited thereto, and the optical elements 5100 may be formed on at least one of the front surface or the rear surface of the cover 5000.

Figure 32:
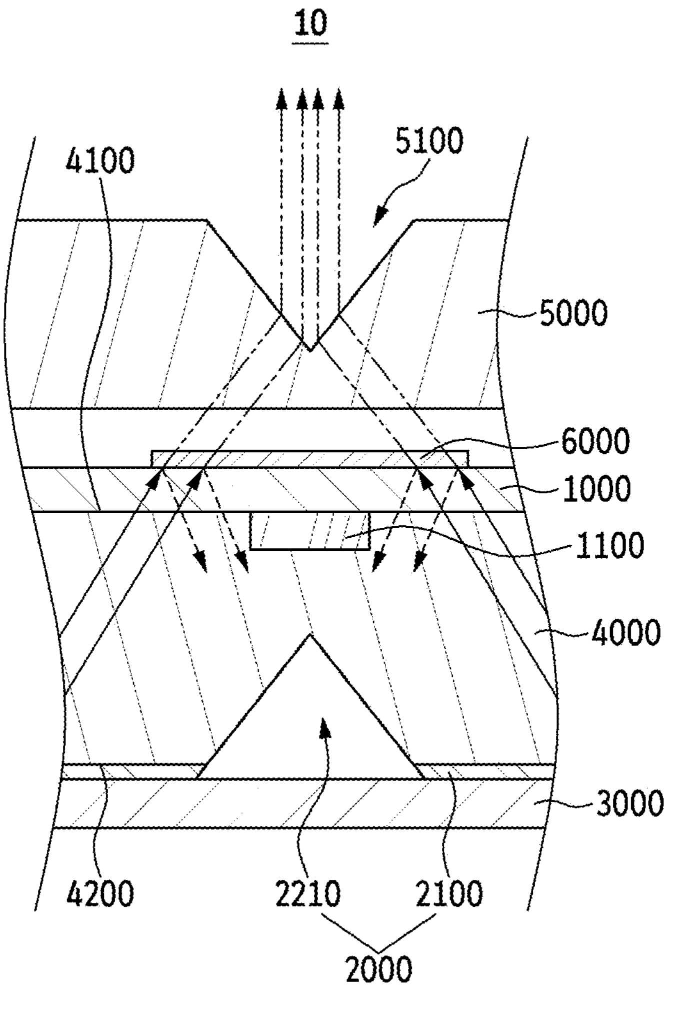
FIG. 32 is a schematic view illustrating an optical path affected by an optical element according to the seventh embodiment of the present disclosure.

As illustrated in FIG. 32, the optical elements 5100 may deflect the light transmitted through the light diffusion layers 6000. Consequently, when viewed from the front of the substrate 1000, the optical elements 5100 may prevent shadow regions from being formed by the first light sources 1100.

In the seventh embodiment of the present disclosure, an example has been described in which the optical elements 5100 scatter a portion of the light that has passes through the substrate 1000, thereby preventing or reducing the shadow regions. However, the present disclosure is not limited thereto, and the optical elements 5100 may be designed to improve the shadow regions caused by the first light sources 1100 by relying on diffusion, scattering, collimation, or any combinations thereof, depending on the viewing angle.

In the seventh embodiment of the present disclosure, an example has been described in which a plurality of optical elements 5100 are formed together with the light diffusion layers 6000 to improve the shadow regions caused by the first light sources 1100 installed on the rear surface of the substrate 1000, but the present disclosure is not limited thereto. The shadow regions may be improved by either the light diffusion layers 6000 or the optical elements 5100 alone.

Figure 33:
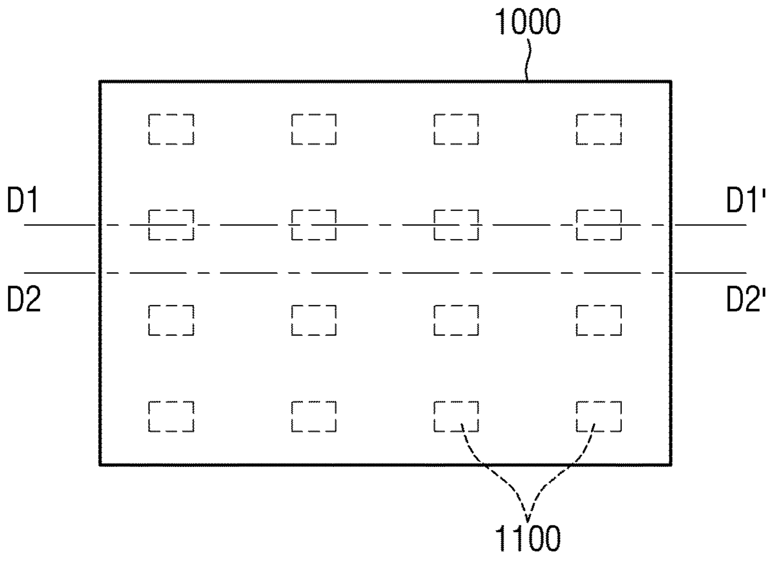
FIG. 33 is a schematic view illustrating lines along which the brightness of a light-emitting module according to an embodiment of the present disclosure is measured.
Figure 34:
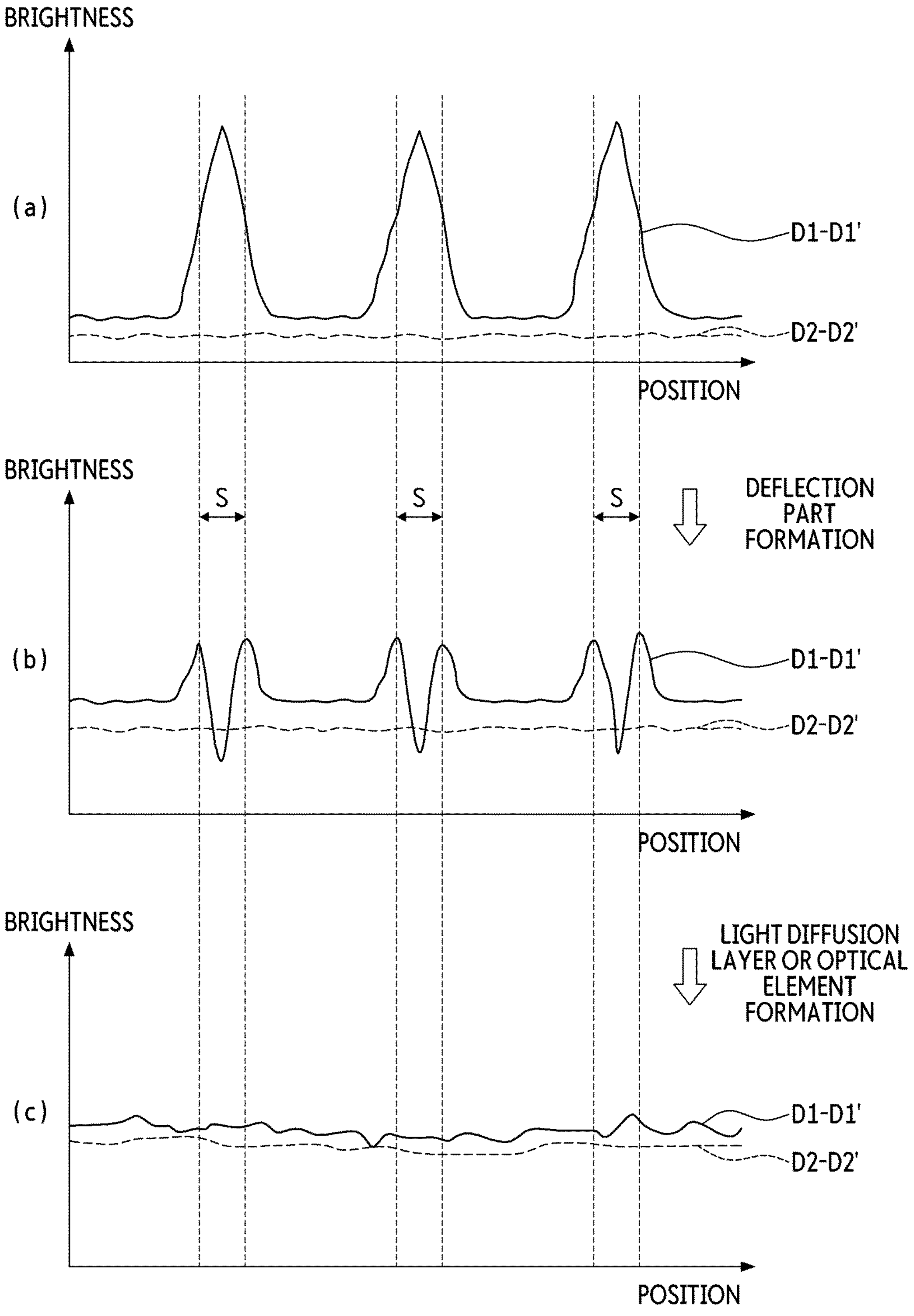
FIG. 34 illustrates graphs of brightness distributions along the brightness measurement lines in FIG. 33.

FIG. 33 is a schematic view illustrating lines along which the brightness of a light-emitting module according to an embodiment of the present disclosure is measured, and FIG. 34 illustrates graphs of the brightness distributions along the brightness measurement lines in FIG. 33. Line D1-D1' may be understood as a line that passes through a plurality of first light sources 1100 in one direction, and line D2-D2' may be understood as a line that passes between adjacent first light sources 1100.

Referring to FIGS. 33 and 34, when first light sources 1100 are installed on the front surface of a substrate 1000, the deflection part 2000 described in any one of the previous embodiments may not be included. Consequently, as illustrated in the top panel of FIG. 34, hotspots may occur since the brightness becomes relatively higher in sections S corresponding to the emission surfaces of the first light sources 1100, and light mixing may be insufficient. As a result, the brightness between the adjacent first light sources 1100 may become lower. However, when the deflection part 2000, including the reflective surface 2100, the diffusion elements 2200, and the reflective layer 2300, is formed, the light emitted from the first light sources 1100 installed on the rear surface of the substrate 1000 may be diffused by the reflective surface 2100 and the diffusion elements 2200, as illustrated in the middle panel of FIG. 34. In this case, the brightness along both lines D1-D1' and D2-D2' may become relatively higher, and the brightness differences therebetween may be reduced. As a result, sufficient brightness to implement surface emission can be obtained while improving the overall brightness uniformity.

In the middle panel of FIG. 34, the brightness in the sections S corresponding to the first light sources 1100 may be relatively reduced since the first light sources 1100 are installed on the rear surface of the substrate 1000, causing shadow regions when viewed from the front of the substrate 1000. However, as illustrated in the bottom panel of FIG. 34, when either the light diffusion layers 6000 or the optical elements 5100 are formed, the shadow regions caused by the first light sources 1100 being installed on the rear surface of the substrate 1000 may be further improved. Consequently, the brightness differences between lines D1-D1' and D2-D2' can be further reduced, allowing the light-emitting module 10 to implement a surface light source with a significantly improved uniformity of brightness.

Figure 35:
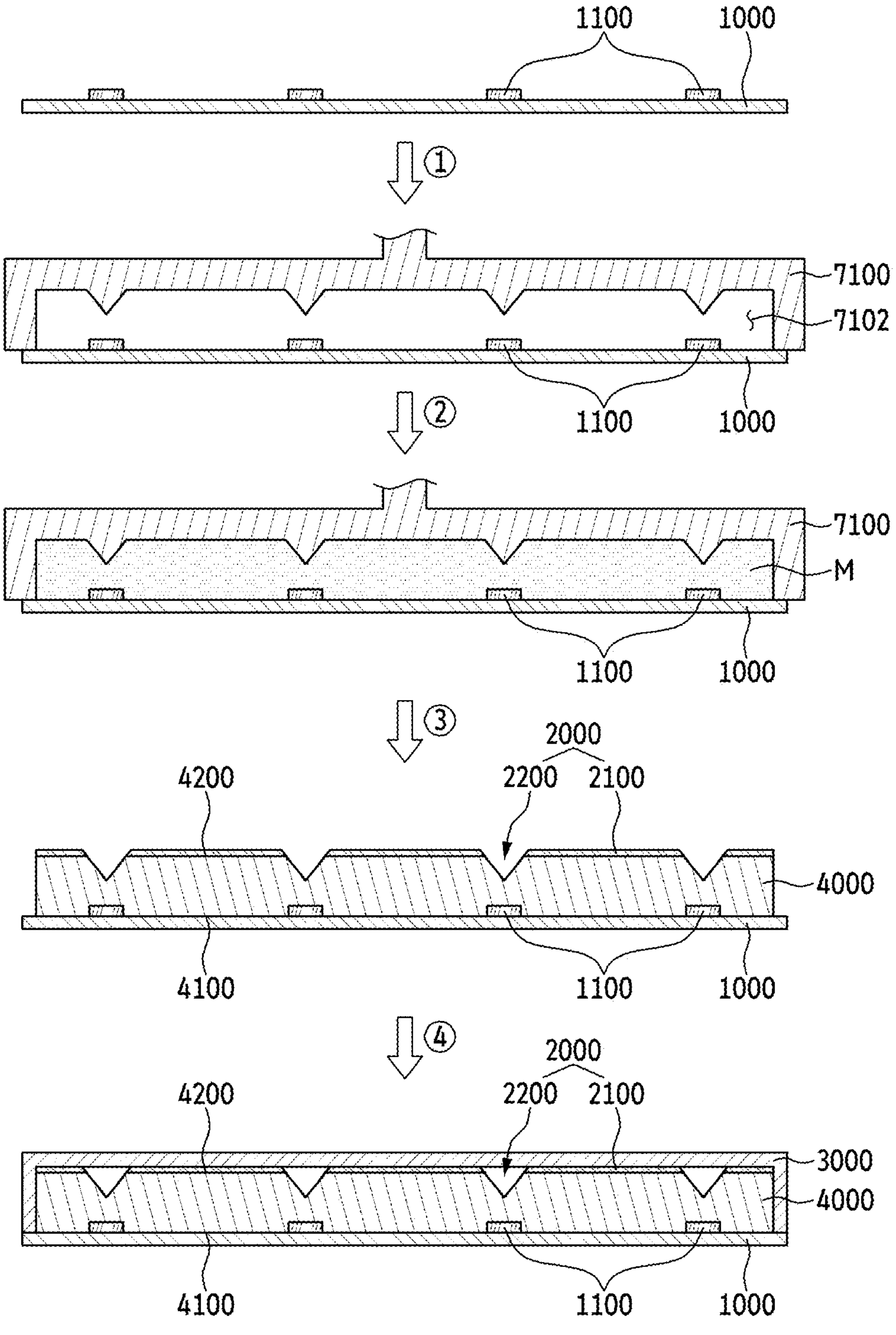
FIG. 35 illustrates the manufacturing process of a light-emitting module according to embodiments of the present disclosure.

FIG. 35 illustrates the manufacturing process of a light-emitting module according to an embodiment of the present disclosure. FIG. 35 illustrates an example in which a deflection part 2000 includes both a reflective surface 2100 and diffusion elements 2200. A cover 5000 is omitted for illustration purposes.

Referring to FIG. 35, in the manufacturing process of a light-emitting module 10 according to an embodiment of the present disclosure, a mold 7100 may be first positioned at the rear of a substrate 1000, on which a plurality of first light sources 1100 are installed, to form a transmissive material 4000 (①; note that the substrate 1000 is shown inverted in the figure). Subsequently, a molding material M may be injected into a cavity 7102 of the mold 7100 to form the transmissive material 4000 (②).

After the injection of the molding material M, the injected molding material M may be allowed to cure, thereby forming the transmissive material 4000, in which diffusion elements 2200 are imprinted. Once the transmissive material 4000 is molded, the mold 7100 may be removed, and a reflective surface 2100 may be formed on at least a portion of a rear surface 4200 of the transmissive material 4000, the reflective surface 2100 functioning as the above-described deflection part 2000 (③). Thereafter, the substrate 1000 and the transmissive material 4000 may be assembled within a holder 3000 (④).

FIG. 35 describes an example where the transmissive material 4000 is formed by curing the molding material M injected at the rear of the substrate 1000 (i.e., on a top surface according to the orientation shown in FIG. 35), but the present disclosure is not limited thereto. Alternatively, the transmissive material 4000 may be fabricated through a separate process and then joined to the rear of the substrate 1000.

As described above, since the mold 7100 is disposed at the edges of the substrate 1000 during the molding of the transmissive material 4000, the substrate 1000 may be damaged due to the pressure applied to portions of the substrate 1000 in contact with the mold 7100.

Figure 36:
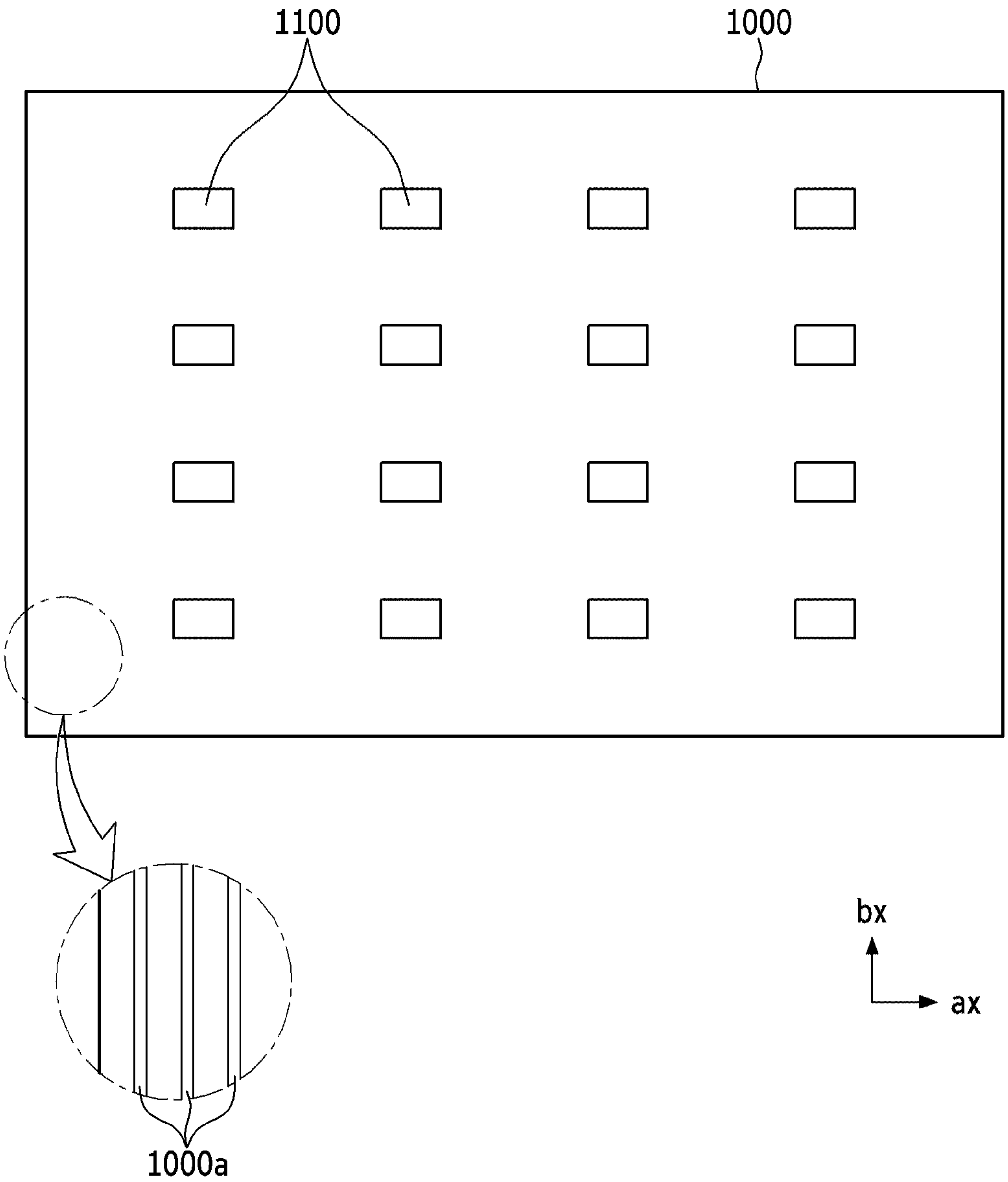
FIGS. 36 and 37 are schematic views illustrating reinforcing members formed on a substrate according to an embodiment of the present disclosure.
Figure 37:
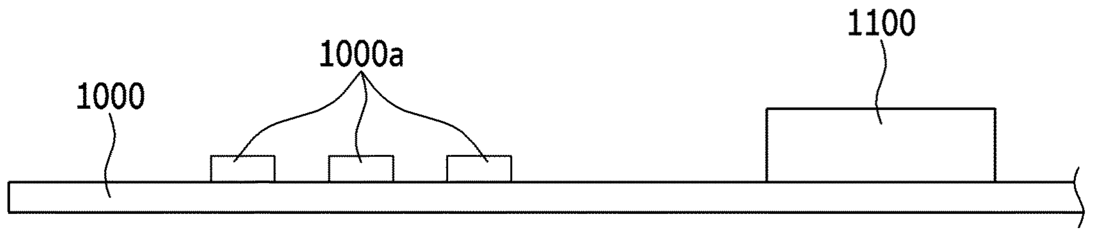

To prevent this potential problem, reinforcing members 1000*a* may be formed on at least some portions of the edges of the substrate 1000, as illustrated in FIGS. 36 and 37, to increase the rigidity of the substrate 1000 against external pressure applied by the mold 7100. The reinforcing members 1000*a* may be formed as circuits during the formation of circuitry for power supply and control of the first light sources 1100 installed on the substrate 1000.

Assuming that the substrate 1000 has a major axis ax and a minor axis bx, the reinforcing members 1000*a* may preferably be formed on the edges along the major axis ax, which has relatively lower rigidity. The reinforcing members 1000*a* may optionally be formed on the edges along the minor axis bx as needed.

FIGS. 36 and 37 illustrate an example where the reinforcing members 1000*a* are formed along the edges of both the major axis ax and the minor axis bx of the substrate 1000.

Figure 38:
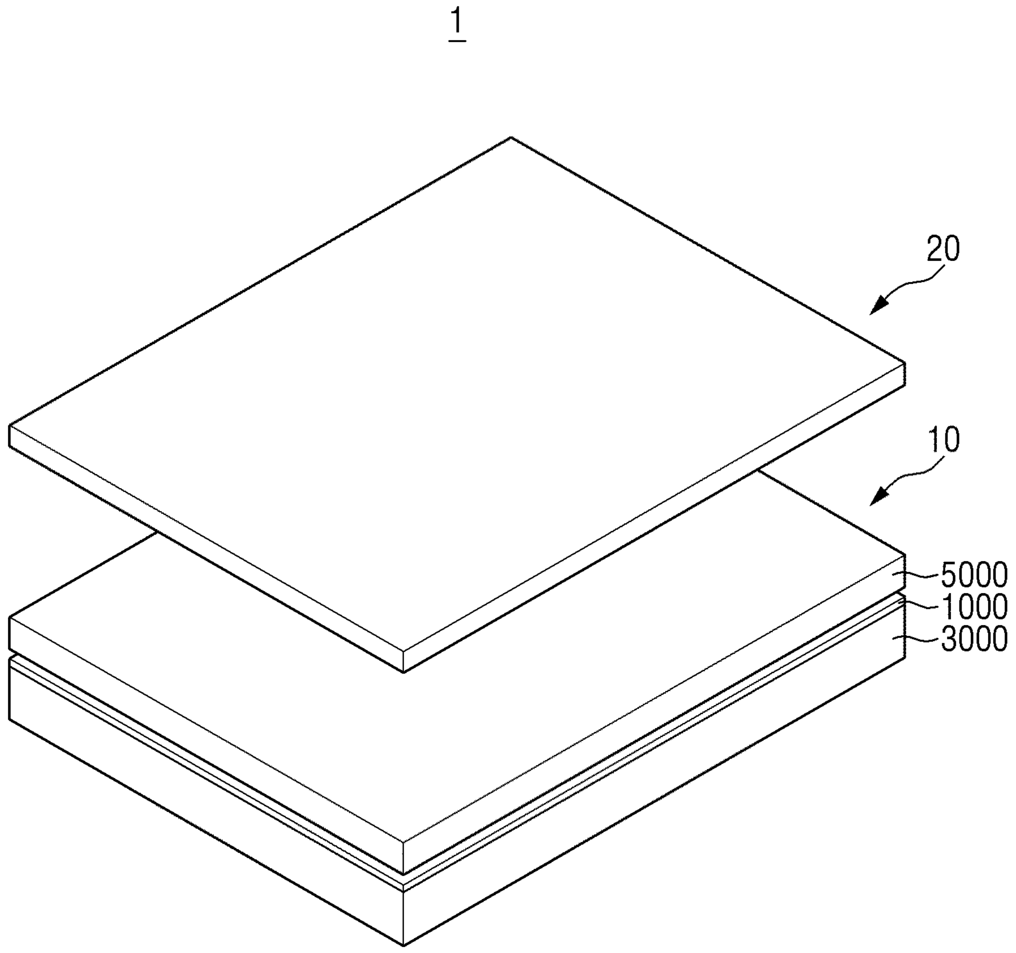
FIG. 38 is a perspective view illustrating a vehicle lamp according to an embodiment of the present disclosure.

FIG. 38 is a perspective view illustrating a vehicle lamp according to an embodiment of the present disclosure.

Referring to FIG. 38, a vehicle lamp 1 according to an embodiment of the present disclosure may include a light-emitting module 10 and a diffusion lens 20. The light-emitting module 10 may be understood as any of the light-emitting modules 10 described in the previous embodiments or any combinations thereof.

To diffuse the light that is emitted from the light-emitting module 10 through a cover 5000 and projected externally, at least one of the incident surface or exit surface of the diffusion lens 20 may be subjected to etching, or may be formed with diffusion patterns. As a result, when viewed from outside the vehicle, a surface light source that creates a lighting image with a substantially uniform brightness may be implemented by the light emitted from the vehicle lamp 1.

Additionally, the diffusion lens 20 may serve not only to diffuse the light but also to protect the light-emitting module 10 from damages due to external impact and the like.

As described above, the light-emitting module 10 or the vehicle lamp 1 may include a plurality of first light sources 1100 installed on the rear surface (i.e. the surface that faces the inner side of the vehicle) of a substrate 1000. Light emitted in a first direction from the first light sources 1100 may be deflected in a second direction by a deflection part 2000 disposed at the rear of the substrate 1000. The light deflected in the second direction may pass through the substrate 1000 and may then be emitted externally. As a result, the gap required for light mixing to implement a substantially uniform surface emission can be decreased, thereby enabling miniaturization while still allowing for the diffusion of light emitted from the first light sources 1100. This configuration can enhance the uniformity of brightness for the surface emission implemented by the light-emitting module 10.

Furthermore, by selectively including one or more openings in at least a portion of a reflective surface 2100 or a reflective layer 2300, a wider variety of emission images can be obtained.

In concluding the detailed description, those skilled in the art will appreciate that many variations and modifications can be made to the exemplary embodiments without substantially departing from the principles of the present disclosure. Therefore, the disclosed exemplary embodiments should be used in a generic and descriptive sense only and not for purposes of limitation.

What is claimed is:

1. A light-emitting module comprising:

a substrate formed of a transparent material;

at least one light source installed on a rear surface of the substrate to emit light in a first direction;

a deflection part disposed at a rear of the substrate to cause the light emitted in the first direction to be deflected in a second direction, which is different from the first direction;

a holder disposed at the rear of the substrate to support the substrate; and a transmissive material disposed between the substrate and the holder, wherein the transmissive material is molded by placing a mold on the substrate, and wherein the substrate includes a reinforcing member formed along at least a portion of an outer peripheral region of the substrate to increase rigidity of the substrate, thereby preventing or reducing damage to the substrate caused by pressure applied by the mold during said molding of the transmissive material.

2. The light-emitting module of claim 1, wherein the deflection part includes a reflective surface formed on at least a portion of a rear surface of the transmissive material.

3. The light-emitting module of claim 2, wherein the rear surface of the transmissive material includes one or more openings, which are regions where no reflective surface is formed, to allow an emission image by the light deflected in the second direction to include a plurality of regions having different brightnesses.

4. The light-emitting module of claim 1, wherein the deflection part includes at least one diffusion element formed on a rear surface of the transmissive material to be recessed toward a front surface of the transmissive material to diffuse at least a portion of the light emitted in the first direction and deflect it in the second direction by reflection and/or refraction depending on an angle of incidence of the light, and wherein the at least one diffusion element is formed in a substantially conical shape.

5. The light-emitting module of claim 1, wherein the deflection part includes a reflective layer formed on at least a portion of a surface of the holder that faces the substrate.

6. The light-emitting module of claim 5, wherein the surface of the holder that faces the substrate includes one or more openings, which are regions where no reflective layer is formed, to allow an emission image by the light deflected in the second direction to include a plurality of regions having different brightnesses.

7. The light-emitting module of claim 1, wherein the deflection part includes:

a reflective surface formed on at least a portion of a rear surface of the transmissive material; and a reflective layer formed on at least a portion of a surface of the holder that faces the substrate, and wherein the reflective surface and the reflective layer are formed in different colors.

8. The light-emitting module of claim 1, further comprising:

at least one light diffusion layer disposed to overlap the at least one light source so as to diffuse light that passes near the at least one light source.

9. The light-emitting module of claim 8, wherein the at least one light diffusion layer transmits a portion of the light deflected in the second direction while reflecting another portion of the light deflected in the second direction.

10. The light-emitting module of claim 1, further comprising:

a cover disposed in front of the substrate to transmit at least a portion of the light deflected by the deflection part therethrough, wherein the cover includes at least one optical element formed at a position corresponding to the at least one light source to deflect the light transmitted through the substrate.

11. A vehicle lamp comprising:

the light-emitting module of claim 1; and a diffusion lens disposed in front of the light-emitting module to diffuse light emitted from the light-emitting module, wherein a direction in which the light is emitted from the light-emitting module is different from a direction in which light is emitted from the at least one light source.

* * * * *